United States Patent
Gyani

(10) Patent No.: US 12,300,228 B2
(45) Date of Patent: May 13, 2025

(54) VOICE MESSAGE AND INTERACTIVE VOICE RESPONSE PROCESSING SYSTEM AND METHOD

(71) Applicant: OPEN TEXT HOLDINGS, INC., San Mateo, CA (US)

(72) Inventor: Param Jyoti Gyani, Cedar Park, TX (US)

(73) Assignee: Open Text Holdings, Inc., Menlo Park, CA (US)

( * ) Notice: Subject to any disclaimer, the term of this patent is extended or adjusted under 35 U.S.C. 154(b) by 147 days.

(21) Appl. No.: 17/749,959

(22) Filed: May 20, 2022

(65) Prior Publication Data

US 2023/0410799 A1 Dec. 21, 2023

(51) Int. Cl.
| | |
|---|---|
| *G10L 15/22* | (2006.01) |
| *G06F 3/16* | (2006.01) |
| *G10L 15/26* | (2006.01) |
| *H04M 3/533* | (2006.01) |

(52) U.S. Cl.
CPC .............. *G10L 15/22* (2013.01); *G06F 3/167* (2013.01); *G10L 15/26* (2013.01); *H04M 3/533* (2013.01); *G10L 2015/223* (2013.01)

(58) Field of Classification Search
CPC ................................ H04M 3/533; G10L 15/26
USPC ....................................................... 379/88.04
See application file for complete search history.

(56) References Cited

U.S. PATENT DOCUMENTS

| | | | |
|---|---|---|---|
| 7,515,695 B1* | 4/2009 | Chan ...................... | H04M 3/493 709/227 |
| 10,455,085 B1* | 10/2019 | Roundy ................ | H04W 12/12 |
| 2016/0140965 A1* | 5/2016 | Kumar ................. | H04N 21/233 704/9 |
| 2019/0005978 A1* | 1/2019 | Barnett ................... | G10L 15/26 |
| 2023/0077835 A1* | 3/2023 | Swerdlow ......... | H04M 3/42195 379/88.19 |

\* cited by examiner

*Primary Examiner* — Amal S Zenati
(74) *Attorney, Agent, or Firm* — Sprinkle IP Law Group

(57) ABSTRACT

According to one aspect of the present disclosure, the voice message analysis system receives a voice message from a voicemail system, performs a voice-to-text transcription, and applies a set of rules to the transcription of the voice message. The actions have associated data that is used when implementing the action. The rules specify criteria for triggering various actions that map to functions of the voicemail system or other functions. The actions have associated data that is used in implementing the actions. A voice message analysis system applies the voice message analysis rules to the transcript of the voice message. Based on a determination that the voice message matches a voice message analysis rule, the voice message system implements the appropriate action, such as by programmatically calling the appropriate function of the voicemail system and providing data for the function based on the data associated with the first action.

18 Claims, 18 Drawing Sheets

| ACTION | ADDITIONAL DATA | DESCRIPTION |
|---|---|---|
| FORWARD MESSAGE | IDENTIFIER OF DESTINATION | FORWARDS VOICE MESSAGE TO VM MAILBOX ASSOCIATED WITH EXTENSION |
| SET METADATA | METADATA TO ADD TO VOICE MESSAGE OR VOICE MESSAGE TRANSACTION | ADDS METADATA TO VOICE MESSAGE AT VM SYSTEM OR TO VM TRANSACTION IN VOICE MESSAGE DATA STORE |
| ADD MENU ITEM | IDENTIFIER OF MENU OPTION FROM VOICEMAIL SYSTEM TO ADD | SELECTS PREDEFINED MENU OPTION FOR INCLUSION IN POST-MESSAGE MENU |
| ADD CUSTOM MENU ITEM | TEXT FOR VOICE PROMPT AND EXTENSION IF MENU ITEM SELECTED | DEFINES CUSTOM MENU OPTION FOR INCLUSION IN POST-MESSAGE MENU |

FIG. 7A

| NAME | ACTION | ADDITIONAL DATA | DESCRIPTION |
|---|---|---|---|
| FORWARD TO BILLING | FORWARD MESSAGE | 7001 | FORWARDS VOICE MESSAGE TO BILLING GROUP |
| FORWARD TO TECH SUPPORT | FORWARD MESSAGE | 7008 | FORWARDS VOICE MESSAGE TO TECH SUPPORT |
| TECH SUPPORT MENU ITEM | ADD MENU ITEM | 507 | TRANSFER TO TECH SUPPORT MENU OPTION |
| MONTHLY BILL | ADD CUSTOM MENU ITEM | "IT LOOKS LIKE YOU HAVE A QUESTION ABOUT <LAST_BILL>. DO YOU WANT TO BE TRANSFERRED TO BILLING?". TRANSFER: 7001 | TRANSFER TO BILLING MENU OPTION |
| Tag_Billing | SET METADATA | GROUP: BILLING | TRANSFER TO BILLING MENU OPTION |

VOICE MESSAGE AND INTERACTIVE VOICE RESPONSE PROCESSING SYSTEM AND METHOD

TECHNICAL FIELD

This disclosure relates generally to processing voice messages. Even more particularly, some embodiments relate to processing voice messages in real-time.

BACKGROUND

Large organizations use call centers to handle customer calls and other calls. Typically, a call center has the ability to handle a large volume of calls at the same time, to screen calls and forward calls to call center agents, and to log calls. To promote effective handling of calls by agents, call centers typically include telecommunications equipment programmed to route incoming calls to call center agents having particular skills or expertise, centers often include technologies to route calls to call center agents having particular skills or expertise.

Call centers typically use automated attendants or interactive voice response (IVR) to route calls to appropriate agents. IVR is a technology that provides a front-end interface to a call center through which customers can interact with an organization's phone system using voice or dual-tone multi-frequency signaling (DTMF) tones. An IVA system provides pre-recorded or dynamically generated audio prompts to the caller and receives touch tone or spoken responses from the caller. Responsive to a caller's input, the IVR system traverses a menu of options to reach a particular service or feature of interest. In this manner, the IVR system can collect information from a caller, which can be used to direct the caller to the appropriate team or agent. A caller, however, may become frustrated if the IVR menu is not tailored to the caller's needs or directs the caller to an agent who is not qualified to handle the call.

If a call center agent is unavailable to handle a call, the call may be routed to a voicemail system that allows the caller to leave a voice message. Depending on the configuration of the system, the voicemail system may store the voice message in a voicemail box of a specific agent, the voicemail box for a team of agents, a general voicemail box for the organization, or some other voicemail box. In any case, callers who leave voicemails have an expectation of a prompt response by a qualified agent. Unfortunately, the customer experience often fails to meet these expectations. In some cases, voice messages languish in general or team mailboxes. In other cases, voice messages are saved to the mailbox of an agent or are picked up by an agent who does not have the appropriate knowledge or skills to respond to the voicemail, leading to delays in responding and potentially multiple back-and-forth calls with the original caller.

As such, new techniques for processing voice messages are desired.

SUMMARY

According to one aspect of the present disclosure, a voice message processing system that comprises a voicemail system and a voice message analysis system. The voicemail system provides a function for voice message handling. The voice message analysis system includes: a data store storing a first action that corresponds to the function of the voicemail system, data associated with the first action, and a first voice message analysis rule that includes a criterion for triggering the first action. The voice message analysis system further includes a processor and a non-transitory, computer-readable medium storing a set of computer-executable instructions that are executable by the processor. The set of computer-executable instructions includes instructions for: accessing a transcript of a voice message from the voicemail system; applying the first voice message analysis rule to the transcript of the voice message; and based on a determination that the voice message matches the first voice message analysis rule, interacting with the voicemail system to implement the first action, where interacting with the voicemail system to implement the first action includes programmatically calling the function of the voicemail system and providing data for the function to the voicemail system based on the data associated with the first action.

According to one embodiment, the first voice message analysis rule is a real-time analysis rule that is applied in real-time with respect to the voice message. The set of computer-executable instructions may thus include instructions for: receiving a real-time audio stream of the voice message from the voicemail system; and transcribing the real-time audio stream to create the transcript in real-time with respect to the voice message. The voice message analysis rule is applied such that the function of the voicemail system is called in real-time with respect to the voice message. In other embodiments, the voice message analysis rule is applied post-message.

The voice message analysis system, in accordance with one embodiment, includes a voice message store, a second action, data associated with the second action, and a post-message voice message analysis rule that includes a criterion for triggering the second action. The set of computer-executable instructions further may include instructions for: storing a voice message transaction for the voice message in the voice message store, the voice message transaction including the transcript of the voice message and an associated set of metadata; accessing the post-message voice message analysis rule and the data associated with the second action; applying the post-message voice message analysis rule to the transcript; and based on a determination that the voice message matches the post-message voice message analysis rule, modifying the associated set of metadata of the voice message transaction based on the data associated with the second action.

Implementations may include one or more of the following features. The function of the voicemail system is a message forwarding function and the data for the function indicates a destination voicemail box to which the voice message is to be forwarded. The function of the voicemail system adds metadata to the voice message and the data for the function includes a piece of metadata to add to the voice message. The function of the voicemail system is a voice menu function, and the data for the function indicates a menu option to include in a voice menu to be played after the voice message is recorded. The data associated with the first action includes a variable name for a variable and where the set of computer-executable instructions further may include instructions for; resolving the variable name to determine a value for the variable; and passing the value for the variable to the voicemail system in the data for the function.

Other aspects of the present disclosure include related computer-implemented methods and computer program products. For example, one embodiment includes a computer program product comprising a non-transitory, computer-readable medium storing a set of computer-executable instructions, the set of computer-executable instructions comprising instructions for: accessing a transcript of a voice message from a voicemail system; accessing data associated with a first action that corresponds to a function of the voicemail system and a first voice message analysis rule that comprises a criterion for triggering the first action; and based on a determination that the voice message matches the first voice message analysis rule, interacting with the voicemail system to implement the first action, wherein interacting with the voicemail system to implement the first action comprises programmatically calling the function of the voicemail system and providing data for the function to the voicemail system based on the data associated with the first action.

Another embodiment includes a computer-implemented method comprising: accessing a transcript of a voice message from a voicemail system; accessing data associated with a first action that corresponds to a function of the voicemail system and a first voice message analysis rule that comprises a criterion for triggering the first action; and based on a determination that the voice message matches the first voice message analysis rule, interacting with the voicemail system to implement the first action, wherein interacting with the voicemail system to implement the first action comprises programmatically calling the function of the voicemail system and providing data for the function to the voicemail system based on the data associated with the first action.

Embodiments of the present disclosure provide an improvement to conventional voicemail systems by providing real-time analysis of voice messages to control how the voicemail system handles a message (either a message itself or the call during which the message is being left). By way of example, but not limitation, embodiments can analyze voice messages to route the voice messages more accurately to an appropriate call center agent or group. As another example, some embodiments can augment in real-time the metadata applied to a voice message so that the voice message can be more easily searched or included in analytics by downstream systems. As yet another example, embodiments can dynamically customize voice menus to a caller based on the content of a voice message being left by the caller.

Further, some embodiments provide post-message analysis to facilitate more accurate routing of voice messages to appropriate call center agents and make the voice messages more readily searchable (e.g., for responding to the voice messages or for analytics).

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 7A illustrates one embodiment of example action types;

FIG. 7B illustrates one embodiment of example actions;

FIG. 8 is a diagrammatic representation of one embodiment of an operator interface page with controls to define an action;

DETAILED DESCRIPTION

Figure 1:
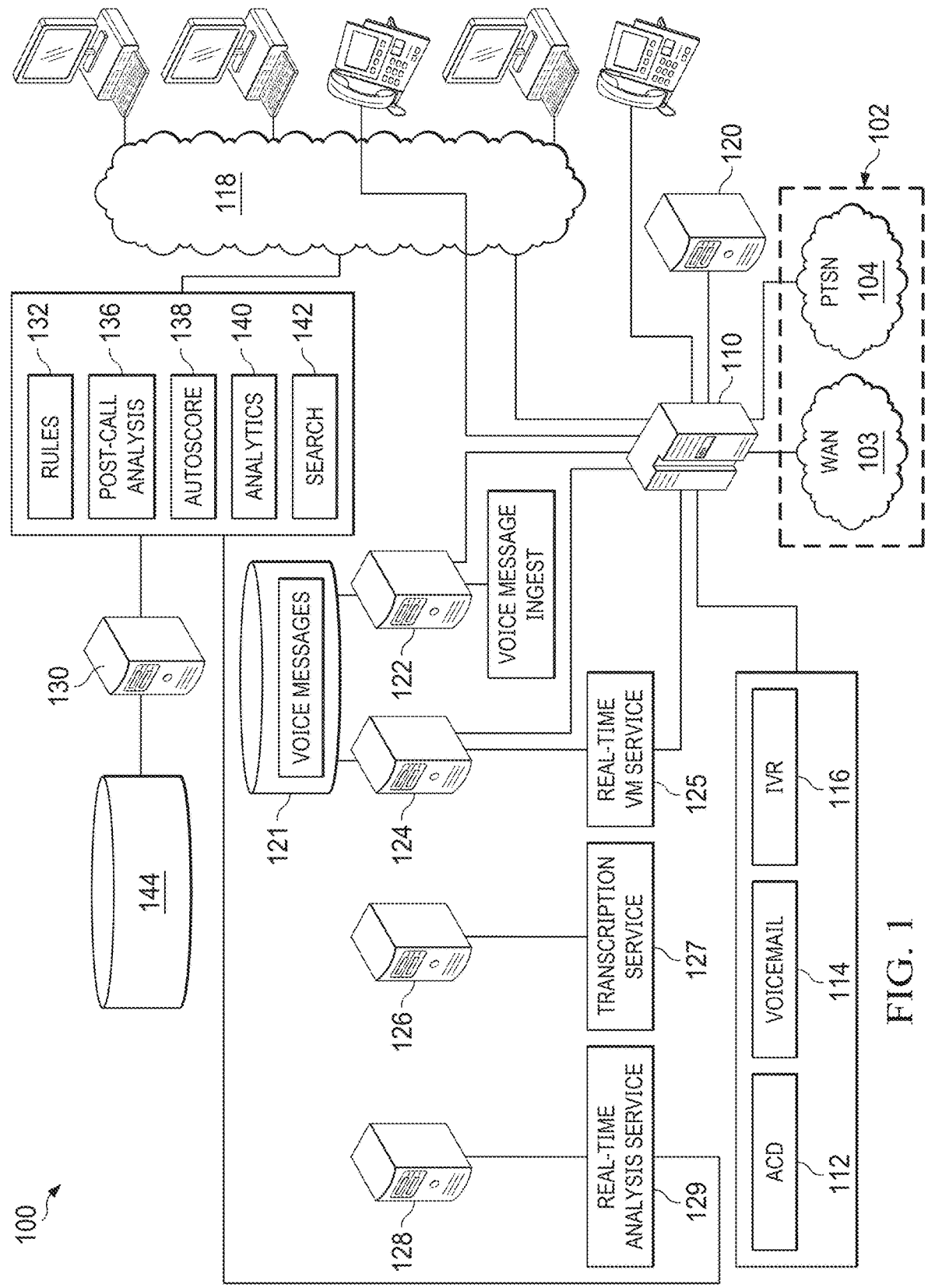
FIG. 1 is a diagrammatic representation of one embodiment of a call center system coupled to a telephony network.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Embodiments of the present disclosure provide systems and methods for real-time processing of voice messages and post-message processing of voice messages. For purposes of this application "real-time" with respect to a voice message means during the time in which the caller is leaving the voice message until the call session during which the message is left is terminated or transferred to another extension or mailbox. "Post-message" refers to after the call session during which the message is left is terminated or transferred to another extension or mailbox. A post-message analysis of voice message can occur, for example, post-call—that is, after the call session during which the voice message was left is terminated.

One aspect of the present disclosure includes a voice message processing system is provided. According to one embodiment, the voice message processing system includes a computer system configured to perform particular operations of a voice message analysis system and a voicemail system by virtue of having software, firmware, hardware, or a combination of them installed on the computer system that in operation causes the system to perform the operations of the voice message processing system.

The voice message analysis system defines actions that can be applied based on voice messages and voice message analysis rules that specify criteria for triggering the actions. By analyzing the voice messages from the voice mail system, the voice message analysis system determines which actions to invoke with respect to the voice messages. The voice message analysis system applies voice message analysis rules to trigger actions with respect to voice messages received from the voicemail system. The voice message analysis rules may be applied in real-time or post-message depending on implementation.

The voicemail system can include functions for handling voice messages, such as functions to forward voice messages, add metadata to voice messages, provide voice menus to callers after voice message, or other functions. Actions of the voice message analysis system may map to the functions of the voicemail system or to functions of other components. Thus, in accordance with some embodiments, the voice message analysis system applies voice message analysis rules to invoke the functions of the voice mail system.

FIG. 1 is a block diagram illustrating one embodiment of a call center system 100 coupled to a voice network 102 over which call sessions can be established with call center system 100. In the illustrated embodiment, voice network 102 includes a wide area network (WAN) 103 for VoIP calls and a public switched telephone network (PSTN) 104 for telephony calls. Call center system 100 is capable of receiving a large number of calls over voice network 102 at any given time. These calls are transferred through call center system 100 and a variety of actions are taken with respect to the calls. Among other functionalities, call center system 100 collects data about the calls, call center agents and callers during the calls.

Call center system 100 comprises a call handling system 110 to connect incoming calls to terminals in call center system 100 and outgoing calls to voice network 102. Call handling system 110 comprises hardware and software to provide a number of call handling services. More particularly, call handling system 110 comprises features such as, but not limited to, a call distribution system 112 to distribute calls, a voicemail system 114 and interactive voice response functionality (IVR 116), which may be integrated with call distribution system 112 or voicemail system 114. Call handling system 110 communicates with a data network 118, a private branch exchange or other network either directly or indirectly, to facilitate handling of incoming calls. The call handling system 110 also supports computer-telephony integration (CTI).

Call handling system 110 is coupled to an adjunct services system 120 that comprises a CTI application or platform, contact control service or adjunct services accessible by call center system 100 to perform call center functions. Adjunct services system 120 may include a link to other components of the call center's management information system (MIS) host for obtaining agent and supervisor names, identification numbers, expected agent schedules, customer information, or any other information relating to the operation of the call center. As will be appreciated, call handling system 110 can add metadata retrieved from adjunct services system 120 to individual calls.

It will be appreciated that all or a portion of call handling system 110 and adjunct services system 120 can be implemented as hosted services—for example, as features of a contact center as a service (CCaaS) or unified communications as a service (UCaaS). There are a number of commercial providers that provide cloud based CCaaS and UCaaS solutions that provide call routing, voicemail, IVR and CTI services for call centers.

Call handling system 110 is coupled to potentially numerous voice instruments (e.g., telephones, computers with virtual phone (commonly known as a softphone) or VoIP software or other voice instruments) via a private branch exchange link, VoIP link or types of call links. Call distribution system 112 comprises hardware and software to route calls as needed. For example, call distribution system 112 may comprise hardware and software to route calls to individuals (e.g., individual agents), groups, queues for specific functions in an organization, or queues for general calls. According to one embodiment, call distribution system 112 comprises a physical or virtual automatic call distributor (ACD) with IVR menus. In addition, or in the alternative, call distribution system 112 includes a physical or virtual private branch exchange or other call routing hardware or software.

Call distribution system 112 may perform one or more various functions, such as recognizing and answering incoming calls, determining how to handle the calls, identifying the appropriate agents, group or other destination for each call, queuing calls, routing calls to agents when the appropriate agents become available for each call, and routing calls to voicemail. As will be appreciated, call handling system 110 may use information about the call, caller or call center or other information gathered by call center system 100 to determine how to route a call. For example, the call handling system 110 may use the caller's telephone number, automatic number identification (ANI), dialed number identification service (DNIS) information, the caller's responses to a voice menu, the time of day, or other information to route a call.

Call distribution system 112 can be configured to route calls to voicemail system 114 based on detecting predefined events, such as an agent's line being busy, the agent having a do not disturb notification set, the call not being answered in a certain number of rings, the call remaining in a call queue for a specified period of time without being answered, the caller indicating that they would like to leave a voicemail. In some cases, the rules for routing calls to voicemail include user specified rules. For example, a call agent may specify to route calls to the agent's voicemail during certain times of the day or days of the week.

IVR 116 provides an interface through which users can interact with call center system 100 to provide information and receive information. The IVR system can collect caller input that is responsive to voice prompts provided by the IVR system. Information collected from the caller via IVR system 116 is used to facilitate routing of the call.

Voicemail system 114 comprises hardware and software to provide voicemail services for the call center. Voicemail system 114 can be configured to leverage other services, such as CTI services and other services. Further, voicemail system 114 provides an application programming interface (API) or other interface through which recorded voicemails and related metadata can be imported into other systems.

Voicemail system 114 maintains voicemail boxes for various agents, groups, queues, and for general messages. Voicemail system 114 also supports various functions (e.g., calls, methods, subroutines, endpoints) for voice message handling, that can be programmatically invoked by other computers or programs through an interface, such as an API. More particularly, voicemail system 114 supports functions for voice message handling, such as forwarding voice messages to other voicemail boxes, constructing a voice menu to provide to a caller (e.g., after the message has been recorded, when caller cancels the message, or responsive to another event) and other functions. It can be noted that calling a function of the voicemail system may include making multiple calls to the voicemail system.

Call center system 100 includes a voice message data store 121 for storing voice message transactions. Voice message data store 121 comprises one or more databases, file systems or other data stores, including distributed data stores. Voice message data store 121 may be provided in addition to (or instead of) any voice message data store maintained by voicemail system 114.

Each voice message transaction in voice message data store 121 comprises a voice message transcript and associated metadata. Examples of associated metadata include, but are not limited to, call set-up information, traffic statistics, call type, ANI information, DNIS information, CTI information, agent information, MIS data or other data. For example, voice transaction metadata may include the mailbox to which the message was saved, the extension, user (e.g., agent or other user), group, or queue to which the call was routed prior to going to voicemail, caller id information (e.g., caller name, caller number), the identifier for the outgoing voicemail message (i.e., greeting) provided to the caller by the voicemail system, call time, tags based on real-time analysis of the voice message, metadata collected from a knowledge base, IVR responses recorded with a voice message.

In the illustrated embodiment, call center system 100 includes a voice message ingest system 122, which includes hardware and software to ingest voice messages from voicemail system 114 and store the voice messages in a voice message datastore 123. As discussed, voicemail system 114 provides an API or other interface to allow messages to be imported into other systems. As such, voice message ingest system 122 ingests the voice message data from voicemail system 114. According to one embodiment, the voice message data ingested for each voice message includes the audio recording of a voice message and associated metadata, such as the mailbox to which the message was saved, the extension, user, group, queue to which the call was directed, caller id information (e.g., caller name or caller number), the identity of the outgoing message (i.e., greeting) provided to the caller by the voicemail system, call time, tags based on real-time analysis of the voice message or other metadata provided by voicemail system 114. The voice message data may also include IVR responses recorded with the voice message (e.g., decoded DTMF or voice selections). Voice message ingest system 122 can also collect other metadata associated with the call from other systems.

Voice message ingest system 122 performs a speech-to-text transcription to convert the previously recorded voice messages to text. If recordings of IVR audio responses are included with a voice message, voice message ingest system 122 can transcribe the responses as well. According to one embodiment then, voice message ingest system 122 stores the post-message transcript of a voice message, the recording of the voice message, IVR responses, and the associated metadata in voice message data store 121.

As a caller leaves a voice message, the message is transcribed in real-time, and the text analyzed to drive further interactions with the caller. To this end, call center system 100 includes a real-time voice message services server 124 that provides a real-time voice message service 125, a voice-to-text server 126 that provides a voice-to-text (transcription) service 127, and a real-time analysis server 128 that provides a real-time analysis service 129. Real-time voice message service 125 receives voicemail data from voicemail system 114 in real time and utilizes voice-to-text service 127 and real-time analysis service 129 to transcribe and analyze the voice message. Thus, in addition to (or instead of) voice message ingest system 122 storing voice message data, real-time voice message services server 124, in accordance with one embodiment, stores voice message data, such as real-time transcripts of the voice messages, voice message metadata, or voice message recordings to voice message data store 121 or provides such voice message data to voice message ingest system 122 to be stored in voice message data store 121. A voice message transaction in voice message data store 121 may thus include, as a voice message transaction, a post-message transcript generated from the recorded message, a real-time transcript generated while the message was being recorded, or both.

Intelligent data processing system 130 provides a variety of services such as support for call recording, performance management, real-time agent support, multichannel interaction analysis, and voice message analysis. In the embodiment of FIG. 1, intelligent data processing system includes a rules service 132 through which real-time analysis rules and post-message analysis rules can be defined and accessed, a post-message analysis service 136 that applies post-message analysis rules to voice message transactions from voice message data store 121, an automated scoring service ("autoscore service") 138 that autoscores voice message transactions according to lexicons and autoscore templates, an analytics service 140 to perform analytics on voice message transactions, and a search service 142 that indexes voice message transactions in voice message data store 121. Intelligent data processing system 130 can include a data store 144 that stores various templates, files, tables and any other suitable information to support the services provided by intelligent data processing system 130. Data store 144 may include one or more databases, file systems or other data stores, including distributed data stores. Intelligent data processing system 130 may include other services, including services to configure real-time analysis, post-message analysis, autoscoring and other features of intelligent data processing system 130.

In particular, intelligent data processing system 130 analyzes voice message transactions in voice message data store 121 to route the voice messages to new mailboxes or associate metadata with the voice messages so that the appropriate call center agents can more easily identify and respond to voice messages. In embodiments in which voicemail system 114 supports commands to forward voice messages to other mailboxes, intelligent data processing system 130 interacts with voicemail system 114 to forward voice messages to the appropriate voicemail boxes as determined by the post-message analysis. Intelligent data processing system 130 can also perform analytics to improve IVR menus or otherwise improve call center system 100.

Each of call handling system 110, call distribution system 112, voicemail system 114, IVR 116, adjunct services system 120, voice message ingest system 122, real-time voice message services server 124, voice-to-text server 126, real-time analysis server 128, intelligent data processing system 130 instructions to implement one or more interfaces utilized to gather data from or provide data to other computing devices, data stores, or other components. The interfaces may include interfaces to connect to various sources of unstructured information in an enterprise. It will be understood that the particular interface utilized in a given context may depend on the functionality being implemented, the type of network utilized to communicate with any particular system, the type of data to be obtained or presented, the time interval at which data is obtained from the entities, the types of systems utilized. Thus, these interfaces may include, for example web pages, web services, a data entry or database application to which data can be entered or accessed, APIs, libraries or other types of interfaces which it is desired to utilize in a particular context.

Each of call handling system 110, call distribution system 112, voicemail system 114, IVR 116, adjunct services system 120, voice message ingest system 122, real-time voice message services server 124, voice-to-text server 126, real-time analysis server 128, intelligent data processing system 130 can comprise a computer system with a central processing unit executing instructions embodied on a computer readable medium where the instructions are configured to perform at least some of the functionality associated with embodiments of the present invention. For example, each of call handling system 110, call distribution system 112, voicemail system 114, IVR 116, adjunct services system 120, voice message ingest system 122, real-time voice message services server 124, voice-to-text server 126, real-time analysis server 128, intelligent data processing system 130 comprises one or more computers with central processing units executing instructions embodied on one or more computer readable media. Different combinations of hardware, software, and/or firmware may be provided to enable interconnection between different services or systems of call center system 100 to provide for the obtaining of input information, processing of information and generating outputs.

When a call is received by call handling system 110, call distribution system 112 routes the call to a particular individual, group or queue, potentially based on CTI information collected about the call, call metadata, or selections made via an IVR menu. Based on the detection of a defined event associated with the call (e.g., the call is not answered after a certain number of rings, the call remains in a queue too long without being answered, a user input is received indicating that the user would like to leave a voicemail, the call matching a routing rule), the call is routed to an extension associated with voicemail system 114 or otherwise routed to voicemail system 114 with metadata about the call, such as the identify the extension, agent, group, or queue to which the call was previously routed, caller id information, time of the call and other metadata.

Voicemail system 114 plays a greeting associated with the voicemail box (which may be a default greeting if a voicemail box-specific greeting has not been set up for the voicemail box), followed by a beep or other notification to record an audio message. The voice message is recorded and stored in a database with associated metadata, including metadata to identify that the voice message is a voicemail for a particular extension, agent, group or queue or to otherwise identify the voice message as belonging to a particular voicemail box. Voicemail system 114 notifies the caller that the voice message has been recorded.

As discussed above, voicemail system 114 can be configured to leverage other services. According to one embodiment, when a call is routed to voicemail (e.g., the call is routed to an extension connected to voicemail system 114 or is otherwise routed to voicemail), voicemail system 114 establishes a connection—for example, a WebSocket connection or other connection—with real-time voice message service 125 and provides metadata for the voice message to voicemail system 114. In one embodiment, the metadata includes one or more of the extension, user, group, queue to which the call was directed, caller id information (e.g., caller name or caller number), the identity of the outgoing message (i.e., greeting) provided to the caller by the voicemail system 114 and other metadata for the voice message. As voicemail system 114 is recording the voice message, voicemail system 114 streams the voice message to real-time voice message service 125 as it is being recorded. For example, voicemail system 114 streams way data or audio data according to another audio format to real-time voice message service 125.

Real-time voice message service 125 sets up connections with voice-to-text service 127 and real-time analysis service 129. As a voice message proceeds, real-time voice message service 125 streams or otherwise provides the audio data to voice-to-text service 127 and sends the text data generated by voice-to-text service 127 to real-time analysis service 129. Real-time voice message service 125 sends text packets that include text data generated by voice-to-text service 127 from the voice message audio data to real-time analysis service 129.

Real-time analysis service 129 analyzes the text data according to real-time analysis rules. The real-time analysis rules associate conditions with actions to be performed if the conditions are met. Based on the application of the real-time analysis rules, real-time analysis service 129 sends action data associated with a voice message to real-time voice message service 125 specifying actions for real-time voice message service 125 to take with respect to a voice message. Real-time voice message service 125 maps the action data to functions of voicemail system 114 into a format consumable by voicemail system 114 and sends the action data to voicemail system 114. For example, real-time voice message service 125 maps the actions to functions that can be invoked via the interface for voicemail application 102, calls the functions and sends additional data specified in the actions as parameters of the calls.

In one embodiment, real-time voice message service 125 sends the action data to voicemail system 114 as it is received from real-time analysis service 129. In another embodiment, real-time voice message service 125 collects action data associated with a voice message and sends the action data to voicemail system 114 at the occurrence of a specified event, such as receiving an indication that the caller has completed the voice message or real-time analysis service 129 has processed the last text data from a voice message.

The actions specified in the real-time analysis rules map to functions supported by call handling system 110. For example, the actions specified in real-time analysis rules can map to functions supported by voicemail system 114 or IVR 116. The real-time analysis rules can include, by way of example, but not limitation, actions to create a voice menu to play once the user has finished leaving their voice message, actions to route the caller to an existing or dynamically generated IVR menu, actions to forward voice messages to other voicemail boxes, actions to add metadata to voice messages. It can be noted that voicemail system 114 or IVR 116, in accordance with one embodiment, includes functionality to record the caller's responses to a menu such that the decoded DTMF tone or voice responses are recorded in association with the voice message.

Voicemail system 114, in one embodiment, includes functionality to add additional metadata to a voice message. The real-time analysis rules can thus include actions to add various metadata to voice messages. Thus, in some embodiments, the voice message metadata incorporated by voice message ingest system 122 may include metadata added by real-time analysis service 129.

As discussed above, post-message analysis service 136 applies post-message analysis rules to voice message transactions from voice message data store 121. According to one embodiment, the post-message analysis rules associate conditions with actions to be performed if the conditions are met. By way of example, but not limitation, the actions may include adding metadata to voice transactions. In embodiments in which voicemail system 114 supports functions to forward voice messages to other mailboxes, a post-message analysis rule may specify an action to forward a voice message to another mailbox. In some cases, post-message analysis rules may be based on autoscores generated by autoscore service 138.

Intelligent data processing system 130 can also perform analytics to improve IVR menus or otherwise improve call center system 100. For example, in embodiments in which the callers' responses to voice menus are recorded for voice messages, analytics service 140 can apply machine learning or other models to determine, for example, the relationship of a rule to a response. If a particular response is rarely selected, then the rule that resulted in the menu option being included can be identified for revision. In another embodiment, analytics service 140 applies machine learning models to determine words or phrases that are common to transcripts for voice messages where the callers also selected a particular menu option. In this manner, analytics service 140 may create new lexicons or new words or phrases to add to a lexicon for a rule.

Call center system 100 thus represents one embodiment of a voice message processing system that includes a voicemail system 114 and a voice message analysis system. In the embodiment of FIG. 1, the voice message analysis system includes voice message ingest system 122, real-time voice message services server 124, voice-to-text server 126, real-time analysis server 128, intelligent data processing system 130, voice message data store 121 and data store 144. The voice message analysis system may further include a client tier. Voice message processing systems, however, may be implemented according to other architectures.

Figure 2:
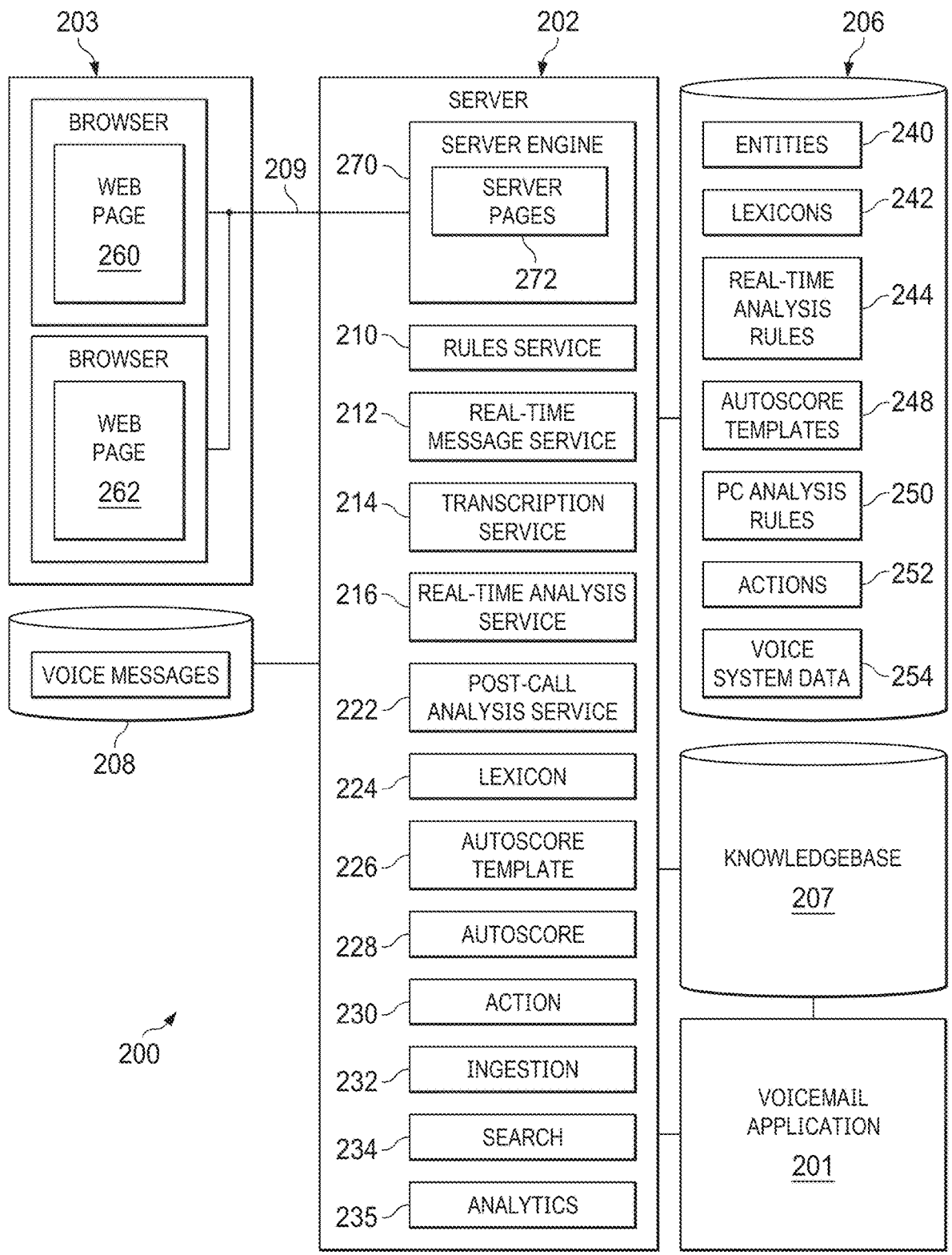
FIG. 2 is a diagrammatic representation of one embodiment of a voice message analysis system.

FIG. 2 is a diagrammatic representation of one embodiment of a voice system message analysis system 200 for analyzing voice messages recorded by a voicemail application 201. Voice message analysis system 200 comprises a server tier 202, a client tier 203, a data store 206, a knowledge base 207, and a data store 208. The server tier 202 is connected to client tier 203 and voicemail application 201 by a network 209. The network 209 may comprise the Internet or other WAN, an enterprise intranet or other LAN, or other type of network or combination of networks.

Server tier 202 comprises a combination of hardware and software to receive voice messages from voicemail application 201, evaluate the voice messages and act based on the results of evaluating the voicemail applications.

Server tier 202 may be implemented according to a variety of architectures. With brief reference to FIG. 1 server tier 202 may be implemented, according to one embodiment, by voice message ingest system 122, real-time voice message services server 124, voice-to-text server 126, real-time analysis server 128, and intelligent data processing system 130. In such an embodiment, data store 208 is an embodiment of voice message data store 121, data store 206 is an embodiment of data store 144, and client tier 203 is implemented on one or more client computers. Knowledge base 207 comprises one or more data stores that include, for example, business information of the enterprise, such as customer account information or other information. The services of server tier 202, in one embodiment, are implemented as a set of cloud services. Moreover, voicemail application 201, in one embodiment, is a voicemail service provided by a cloud-based application, such as a voicemail service provided by a cloud-based CCaaS or UCaaS.

With respect to real-time analysis of voice messages, server tier 202 includes a rules service 210, a real-time voice message service 212, a voice-to-text service 214 and a real-time analysis service 216. With respect to post-message analysis of voice messages, server tier includes rules service 210 and a post-message analysis service 222. Real-time analysis rules and post-message analysis rules may depend on lexicons, autoscores, or actions. As such, server tier 202 includes a lexicon service 224, an autoscore template service 226, an autoscore service 228, and an action service 230.

Various rules may be applied to message data imported from or otherwise provided by voicemail application 201. To this end, server tier 202 includes an ingestion engine 232 to connect to voicemail application 201, ingest voice messages from voicemail application 201, and store the ingested voice messages in voice message data store 208 as voice message transaction. In some embodiments, ingestion engine 232 includes or utilizes a transcription engine to transcribe recorded voice messages as they are ingested. Each voice message transaction in voice message data store 208 comprises voice message metadata associated with at least one of a recorded voice message or a transcript of a voice message.

Server tier 202 also includes search engine 234, which indexes data in data store 206, data store 208 or knowledge base 207, to create a search index, such as an inverted index storing term vectors. More particularly in one embodiment, search engine 234 is configured to index transcripts of voice messages and voice message metadata in data store 208.

Data store 206 comprises one or more databases, file systems or other data stores, including distributed data stores. Data store 206 includes entity data 240 to which voice messages may be directed, such as agents (or other users), groups, and organizational entities having associated call queues (e.g., billing, tech support, general, etc.). According to one embodiment, each entity is associated with one or more extensions to which a call to that entity can be directed and each entity has an associated voicemail box provided by voicemail application 201. In the illustrated embodiment, data store 206 also includes lexicons 242, real-time analysis rules 244, post-message analysis rules 250, autoscore templates 248, actions 252, and voice system data 254. Lexicons 242, real-time analysis rules 244, post-message analysis rules 250, autoscore templates 248, actions 252. Voice system data 254 includes data about voicemail application 201 or voice message analysis system 200 that can be referenced in rules or actions. For example, voice system data 254 includes available extensions, users, groups or queues to which voice messages can be forwarded by voicemail application 201 or voice message analysis system 200, metadata fields for which values can be set at voicemail application 201 or voice message analysis system 200, data describing predefined voice prompts available at voicemail application 201.

Client tier 203 comprises a combination of hardware and software to implement designer operator interfaces 260 for configuring lexicons, autoscore templates, rules, and end-user operator interfaces 262 for accessing voice messages. Designer operator interfaces 260 include controls that allow designers to define lexicons, autoscore templates, rules and otherwise configure the server tier 202. End-user operator interfaces 262 comprise controls that allow users to search and access voice message, create reports or take other actions with respect to voice messages stored in voice message data store 208. Designer operator interfaces 260 and end-user operator interfaces 262 can comprise one or more web pages that include scripts to provide controls. To this end, server tier 202 comprises a server engine 270 configured with server-side pages 272 that include server-side scripting and components. The server-side pages 272 are executable to deliver application pages to client tier 203 and process data received from client tier 203. The server-side pages 272 interface with services of server tier 202.

As discussed, voice message analysis system 200 analyzes voice messages. To this end, voice message analysis system 200 may be associated with a set of message evaluation parameters. The message evaluation parameters may include a lexicon of words or phrases and parameters that are used to control how voice message analysis system 200 automatically determines actions to take based on evaluating a message either in real-time or post-message. In one embodiment, message evaluation parameters are defined in lexicons 242, autoscore templates 248, real-time analysis rules 244, post-message analysis rules 250 and actions 252.

Figure 3:
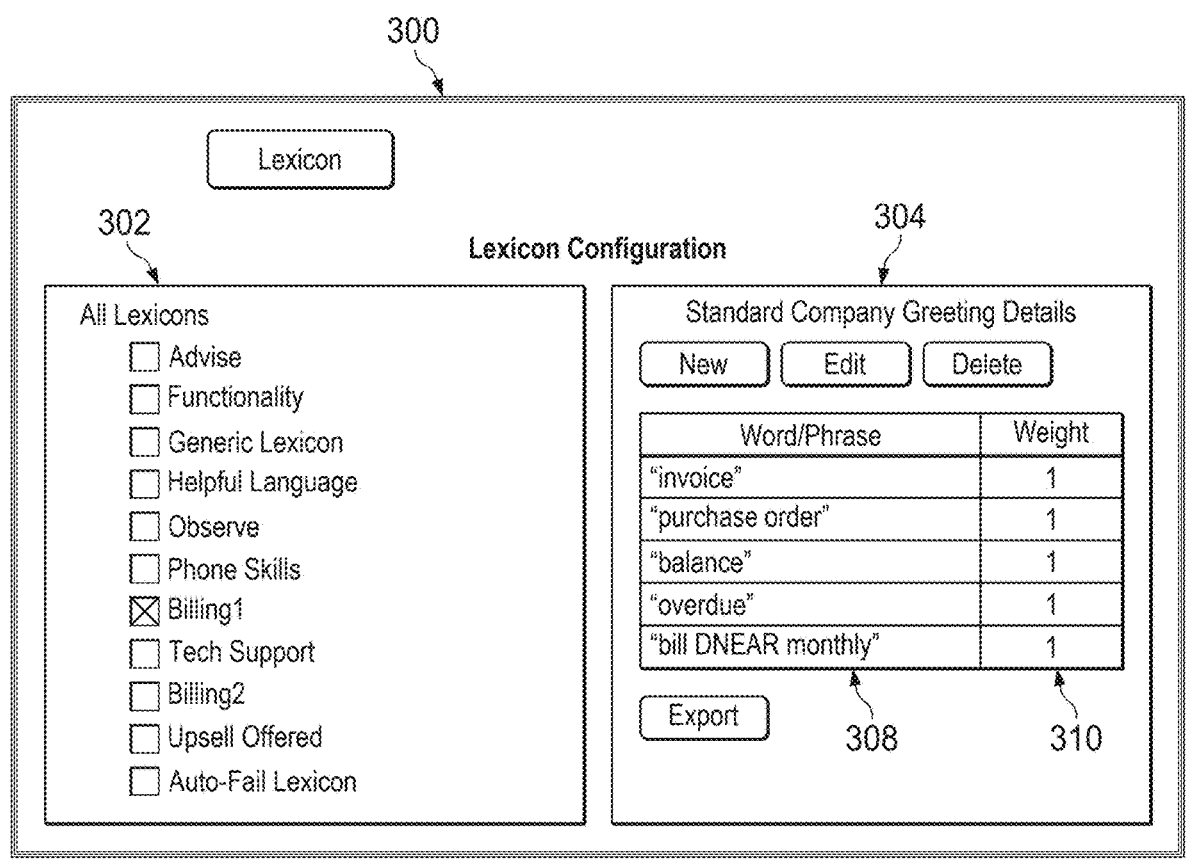
FIG. 3 is a diagrammatic representation of one embodiment of an operator interface page with controls to allow a user to create a lexicon.

As discussed, various rules may depend on lexicons. To this end, server engine 270 and lexicon service 224 cooperate to provide a designer operator interface 260 that allows a user to create new lexicons or perform operations on existing lexicons. FIG. 3, for example, illustrates an example of a designer operator interface page 300 with controls to allow a designer to define a new lexicon, edit an existing lexicon or delete a lexicon. Interface page 300 presents a list of existing lexicons 302 that allows a user to select a lexicon to edit or delete and a lexicon configuration tool 304 that allows the user to create a new lexicon, edit an existing lexicon or delete an existing lexicon. If a user selects to create a new lexicon, lexicon service 224 assigns the new lexicon a unique identifier to identify the lexicon in data store 206. The designer assigns the lexicon a name for ease of searching.

For a lexicon, the designer can specify lexicon parameters, such as a name, description and a set of lexicon entries. Each lexicon entry includes words or phrases 308 that voice message analysis system 200 applies to a voice message to determine if the voice message matches the lexicon. A lexicon entry may include search operators, such as "bill DNEAR monthly" to indicate that the voice message analysis system should search for any combination of "bill" and "monthly" within a predefined word proximity to each other. Thus, a lexicon may include a word or phrase or a search expression. Each entry may include a lexicon entry weight 310, such as a weight of 0-1.

Returning briefly to FIG. 2, server tier 202 may thus receive lexicon data based on interactions with operator interface 260. A lexicon configured via operator interface 260 is stored as a lexicon 242. Lexicons may be stored as records in one or more tables in a database, files in a file system or combination thereof or according to another data storage scheme. Each lexicon can be assigned a unique identifier and comprise a variety of lexicon parameters.

Server engine 270 and autoscore template service 226 cooperate to provide a designer operator interface 260 that allows a user to create new autoscore templates or perform operations on existing autoscore templates (e.g., edit or delete an existing autoscore template). If a user selects to create a new autoscore template, autoscore template service 226 assigns the new autoscore template a unique identifier to uniquely identify the template in data store 206. Each autoscore template 248 can comprise a variety of autoscore template data.

Figure 4:
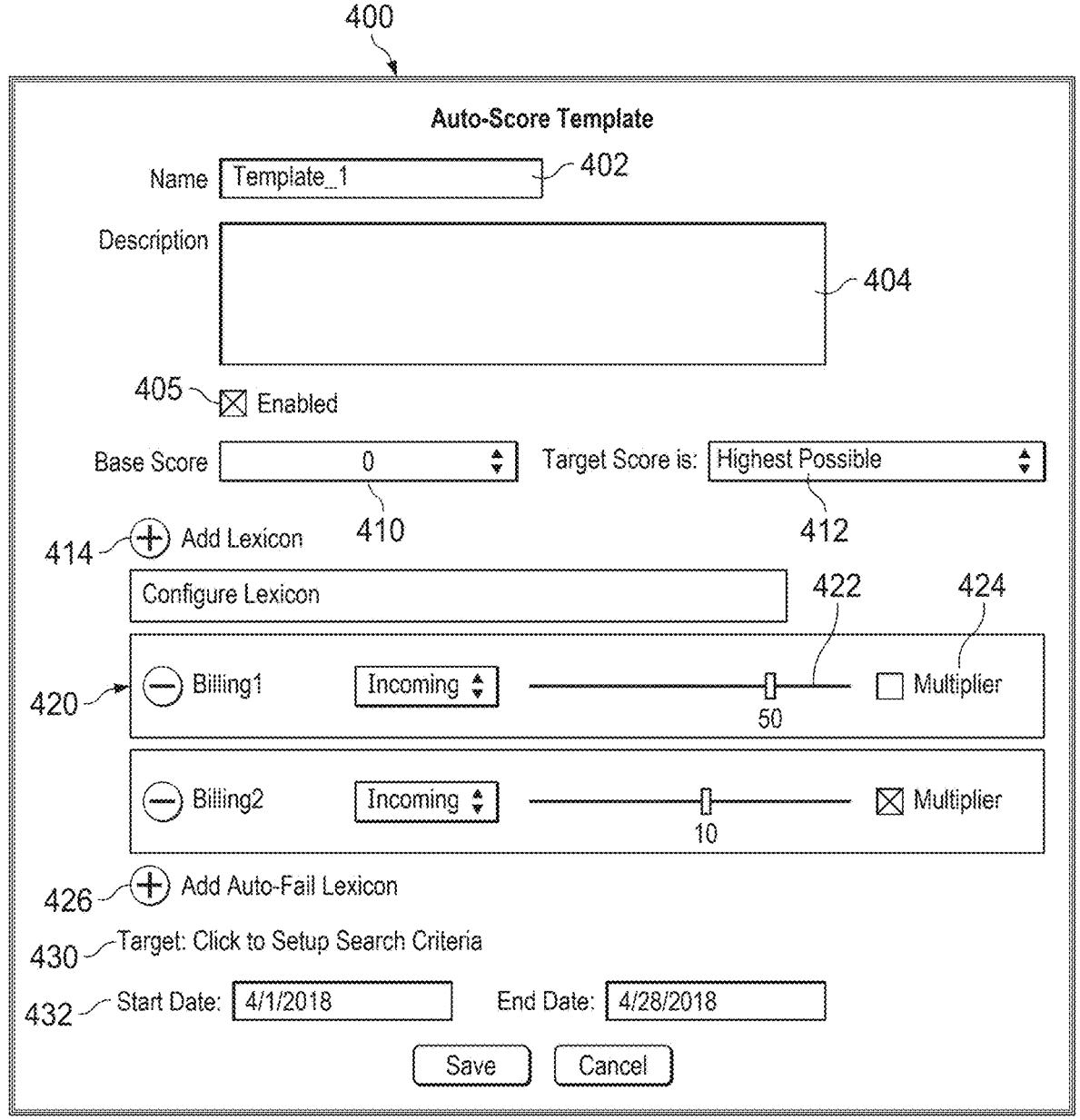
FIG. 4 is a diagrammatic representation of one embodiment of an operator interface page with controls to input parameters of for an automated scoring template.
Figure 5:
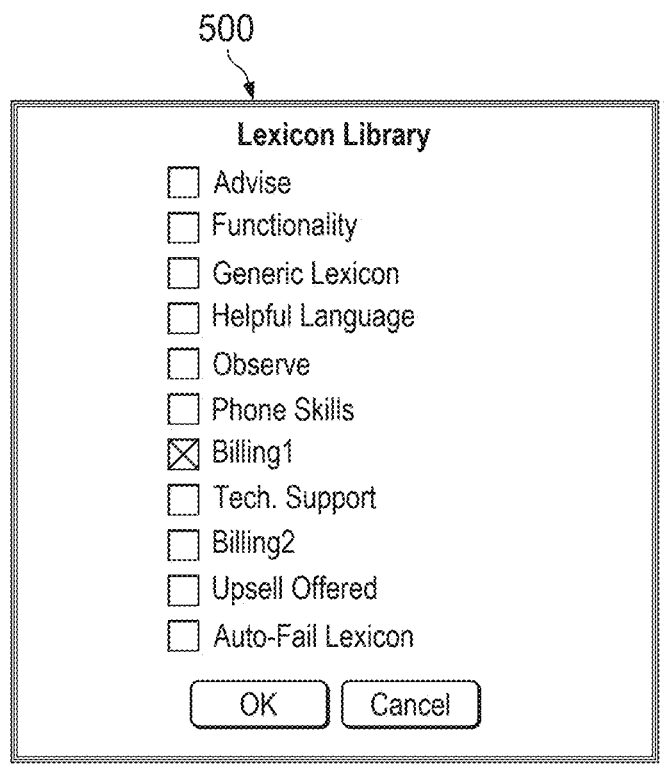
FIG. 5 is a diagrammatic representation of one embodiment of an operator interface page with controls to associate a lexicon with an automated scoring template.
Figure 6:
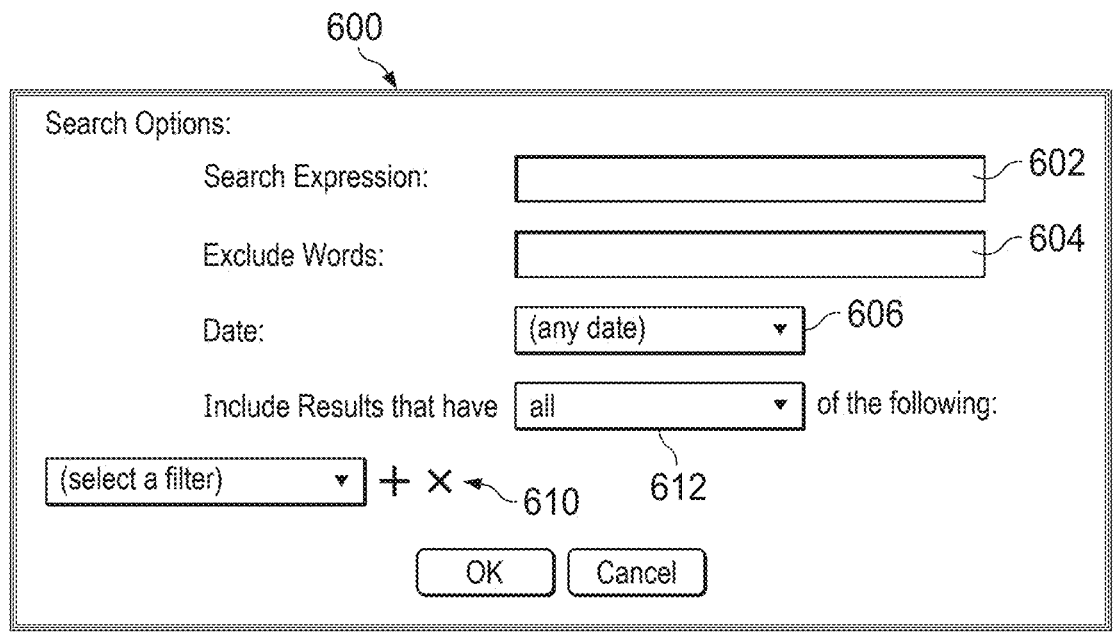
FIG. 6 is a diagrammatic representation of one embodiment of an operator interface page with controls to input search criteria for an automated scoring template.

FIG. 4, FIG. 5 and FIG. 6 illustrate example embodiments of operator interface pages for a designer operator interface 260 with controls to specify template parameters for an autoscore template. In the embodiment illustrated in FIG. 4, the designer operator interface page 400 provides controls 402 and 404 to allow the user to provide a template name and brief description for ease of searching. Enable control 405 allows the user to specify that the template is available to be processed by autoscore service 228.

An autoscore template can include a lexicon and scoring parameters. To this end, operator interface page 400 includes controls that allow a user to associate lexicons with the autoscore template. Operator interface page 400 includes gross scoring controls that allow the user to specify scoring parameters that are not lexicon specific and lexicon specific scoring parameters that are specific to a lexicon within the context of the autoscore template. In FIG. 4, gross scoring controls include base score control 410 and target score control 412. Base score control 410 allows the designer to input the score that will be assigned according to the template if no scores are added or subtracted based on the application of lexicons. Points based on the application of lexicons associated with the autoscore template are added or subtracted from this score when the template is applied. A target score control 412 allows the user to select a final score calculation algorithm from a plurality of predefined final score calculation algorithms to be applied when the autoscore template is applied to an interaction. For example, the voice message analysis system 200 may support multiple calculation methods, such as:

Highest possible: The score for the associated lexicon with the highest score is added to the base score. Results for other lexicons are ignored.

Lowest possible. The score for the associated lexicon with the lowest score is added to the base. Results for other lexicons are ignored.

Cumulative scoring. The scores for all associated lexicons are added to the base score.

The target score control 412 can allow the user to select which method should be applied. It can be noted that, in this embodiment, when only one associated lexicon is used in the template, the target scoring setting may have no effect on the final score.

The designer operator interface page 400 further includes controls 414 to allow the user to associate one or more lexicons of lexicons 242 with the autoscore template. For example, by clicking on "Add Lexicon" or "Add Auto-Fail Lexicon," the user can be presented with an operator interface 260 that provides controls to allow the user to select lexicons from the library of lexicons 242 to add to the autoscore template. FIG. 5, for example, illustrates one embodiment of an operator interface page 500 having controls that allow the user to select which lexicons from lexicons 242 to associate with the autoscore template.

Returning to FIG. 4, the operator interface page 400 shows that, in this example, the autoscore template is linked to the lexicons "Billing1" and "Billing2" selected via operator interface page 400 and includes lexicon specific controls 420 to set lexicon specific scoring parameters for each lexicon associated with the autoscore template. The lexicon specific controls include lexicon weight controls. A slider 422, for example, provides a control to set the lexicon weight value for the "Billing1" for "Template 1". The weight value may be positive or negative, for example plus or minus 100 points, and indicates how many points are to be assigned if the voice message to which the autoscore template is applied matches the lexicon. Multiplier control 424 allows the user to specify how points for the specific lexicon are applied when the auto-template is used to evaluate a voice message. If the multiplier is enabled, the designated number of points defined by the lexicon weight value are added to or subtracted from the base score each time behavior, defined by the lexicon, is exhibited by the specified speaker. If the multiplier is not enabled, the number of points defined by the lexicon weight value is added to or subtracted from the score only the first instance that a voice message matches the lexicon. When the template is applied by autoscore service 228, point values for the template begin with the specified base score and then points are added or deducted based on behavior that matches each specified lexicon, the lexicon weight value specified for the lexicon in the autoscore template, and whether the multiplier is enabled for the lexicon.

In the illustrated example, a voice message to which the autoscore template is applied will be awarded fifty points if the voice message matches any of the entries in the "Billing1" regardless of how many entries in "Billing1" the transaction transcripts match. On the other hand, the voice message is awarded 10 points for every entry in "Billing2" that the transcript matches. As there are five entries in the "Billing1" lexicon according to the example of FIG. 3, a voice message can be awarded up to fifty points based on the "Billing1" lexicon according to the autoscore template of FIG. 4. In another embodiment, when the multiplier is enabled for a lexicon, the voice message is awarded points for every instance in the recording that matches any entry in the "Billing1" lexicon. Thus, if the caller said "invoice" a number of times, the voice message could be awarded ten points for each instance of "invoice."

Further, in some embodiments, the points awarded for matching an entry in a lexicon may be further weighted by the entry weight for that entry (e.g., as specified by weights 310). In any event, the voice message analysis system may limit the final score that a voice message can be awarded to a particular range, such as 0-100.

As will be appreciated, the audio recording (and transcript) of a call to a call center agent may be segregated into an incoming caller channel and an agent channel. Voicemails, however, typically occur over a single channel and segregation of a voicemail into the agent and caller channels may not be relevant. As such, in some embodiments, the lexicon-specific controls for a lexicon to be applied to voicemails do not include a control to assign the lexicon to a particular channel. In other embodiments, the lexicon specific controls 420 include a channel control to allow the user to select the channel to which the associated lexicon will apply—that is, whether the associated lexicon is to be applied to the agent channel, incoming caller channel, or both ("either") when the autoscore template is executed. For a lexicon applied to a voice message, the channel is set, for example, to "incoming."

Using control 426, the user may designate an auto-fail lexicon for the template. If, in a voice message to which the autoscore template is applied, the transcript of the voice message uses words that match the specified auto-fail lexicon, the final score for the voice message for the template can be zero, regardless of other lexicon scores awarded by the template.

Target control 430 allows the user to specify the voice messages to which the template will be applied. In this case, when the user clicks on the text of target control 430, the voice message analysis system 200 presents an operator interface page that displays a search options interface, one example of which is illustrated in FIG. 6.

Turning briefly to FIG. 6, FIG. 6 illustrates one embodiment of an operator interface page 600 used to specify the voice messages to which the autoscore template will apply. More particularly, operator interface page 600 allows the user to specify search criteria that autoscore service 228 applies to determine the voice messages to which to apply the associated autoscore template. In the embodiment illustrated, operator interface page 600 includes search expression control 602 that allows the user to provide search expressions for searching voice messages. According to one embodiment, only voice messages that meet the search expression (or exact words) are returned, Operator interface page 600 further includes exclude words control 604 that allows the user to specify that voice messages that include the words provided should be excluded. In one embodiment, the user may select a lexicon from a drop-down menu so that voice messages that include words in the selected lexicon are excluded. Date control 606 allows the user to input a date range for calls to be included. Additional filter options controls 610 allow the user to input additional filter options for selecting voice messages to which the autoscore template applies. For example, if the call center classifies voice messages by type, such as "sales calls" or "service calls," the user can specify that only voice messages corresponding to sales calls should be included. Control 612 allows the user to specify whether a voice message can meet "any" of the additional filter criteria or must meet "all" of the additional filter criteria to be included in the results to which the template applies.

Returning to FIG. 4, operator interface page 400 further includes an execution data range control 432 that allows a user to specify the date range during which the template is active. The execution date range controls when autoscore service 228 executes the template.

Returning briefly to FIG. 2, server tier 202 may thus receive autoscore template data via interactions in operator interface 260. Autoscore templates configured via operator interface 260 can be persisted as autoscore templates 248 in data store 206. Autoscore templates 248 may be stored as records in one or more tables in a database, files in a file system or combination thereof or according to another data storage scheme. Each autoscore template is assigned a unique identifier and comprises a variety of autoscore template parameters.

Server tier 202 further comprises autoscore service 228 which scores voice messages according to autoscore templates 248. According to one embodiment, autoscore service 228 runs as a background process that accesses voice messages in data store 208 and autoscores the voice messages. The autoscores are stored in a manner that links an autoscore generated for voice message to the autoscore template that was used to generate the autoscore. For example, in one embodiment, when autoscore service 228 generates an autoscore for a voice message using a template, autoscore service 228 stores the autoscore and the template identifier of autoscore template used to generate the score as metadata of the voice message scored using the template.

As discussed, real-time analysis rules 244 and post-message analysis rules 250 can reference the actions 252. FIG. 7A illustrates a non-limiting set of example action types. Here, the example action types include FORWARD MESSAGE, SET METADATA, ADD MENU ITEM, ADD CUSTOM MENU ITEM. Actions are mapped to functions available via voicemail application 201's interface, functions of post-message analysis service 222 or other available functions.

A FORWARD MESSAGE action to forward a voicemail to the appropriate voicemail box. The additional data for a FORWARD MESSAGE includes an identifier corresponding to a destination mailbox. For example, the destination identifier may be an extension number such that a voice message subject to the action will be forwarded to the voicemail box associated with the extension number.

In one embodiment, for a FORWARD MESSAGE action, real-time voice message service 212 invokes the message forwarding function at voicemail application 201 and provides the additional data to voicemail application 201 (e.g., as parameters of an interface call) to cause the voicemail application 201 to forward the message to the voicemail box for the extension, agent, group or queue.

In one embodiment, when post-message analysis service 222 processes a FORWARD MESSAGE action, post-message analysis service 222 invokes the message forwarding function at voicemail application 201 and provides the additional data to voicemail application 201 (e.g., as parameters of an interface call) to cause the voicemail application 201 to forward the message to the appropriate voicemail box. In addition (or instead of) interacting with voicemail application 201 to forward the message, post-message analysis service 222 adds the extensions, users, groups or queues specified in the additional data to the metadata of the voice message transaction. In this manner, a voicemail can be forwarded to the appropriate extension, agent, group or queue within the context of voice message analysis system 200, even if voicemail application 201 did not forward the voice message.

The SET METADATA action is used to set metadata on a voice message. The additional data includes field names or other identifiers of the metadata to be set and the values to be set. In one embodiment, when real-time voice message service 212 processes a SET METADATA action, real-time voice message service 212 invokes the appropriate function at the voicemail application 201 and sends the metadata identifiers and values to voicemail application 201 in a format consumable by voicemail application 201 to cause the metadata to be set on a voice message. Thus, the metadata will already be associated with the voice message when the voice message is ingested by ingestion engine 232. When post-message analysis service 222 processes a SET METADATA action, post-message analysis service 222 sets the metadata on a voice transaction in data store 208.

The ADD MENU ITEM action is used to add a predefined menu option to a post-message voice menu. The additional data includes the identifier of predefined menu options to be added. The ADD CUSTOM MENU ITEM action is used to add a predefined menu option to a post-message voice menu. The additional data includes text for the voice prompt or audio file of the voice prompt depending on the format in which voicemail application 201 accepts custom voice prompts and the destination identifier (e.g., extension) to which the caller is to be transferred or the voice message is to be forwarded if the caller selects the menu option.

In one embodiment, when real-time voice message service 212 processes an ADD MENU ITEM action or an ADD CUSTOM MENU ITEM, real-time voice message service 212 invokes the function to add a menu option to a post message voice menu at voicemail application 201 and sends the menu option in a format consumable by voicemail application 201 to cause the voicemail application 201 to include the menu option in a post-message menu. In other embodiments, real-time voice message service 212 collects menu options for a voice message in a voice menu definition and sends the voice menu definition to voicemail application 201 when the entire voice message has been analyzed (or according to another rule). In any case, real-time voice message service 212, in some embodiments, invokes the function of voicemail application 201 to add menu options to a post message voice menu at voicemail application 201 and sends the menu options in a format consumable by voicemail application 201 to cause the voicemail application 201 to include the menu option in a post-message menu.

In some embodiments, additional data may include variable names that reference data from knowledge base 207. Thus, menu options, metadata added to voice messages or other data may incorporate a variety of data populated from knowledge base 207 by real-time voice message service 212, post-message analysis service 222, voicemail application 201 or other components.

Actions 252 include various instances of available action types configured for different purposes. In the example of FIG. 7B, a first FORWARD MESSAGE action is configured to forward messages to the billing department (e.g., extension 7001) and a second FORWARD MESSAGE action is configured to forward messages to technical support (e.g., extension 7008). FIG. 7B also illustrates an ADD MENU ITEM action to add menu option "507" to a post-message voice menu. In this example, "507" identifies a menu option already defined at voicemail application 201.

FIG. 7B further illustrates an example of a SET METADATA action to add the tag "Billing" to a group metadata field for a voice message.

In addition, FIG. 7B illustrates an example ADD CUSTOM MENU ITEM to add the custom voice prompt "It looks like you have a question about <last_bill>, do you want to be transferred to billing?" and specifies that the if the caller selects the menu option, the caller will be transferred to billing department extension 7001. Here <last_bill> specifies a variable, the value of which is fetched from knowledge base 207. In some embodiments, real-time voice message service 212 populates the value of the variable prior to sending the menu option to voicemail application 201. In embodiments in which voicemail application 201 is capable of incorporating data directly from knowledge base 207, real-time voice message service 212 may send the variable name to voicemail application 201 to allow voicemail application 201 to populate the value in the voice prompt.

It will be appreciated that the action types and actions of FIG. 7A and FIG. 7B are provided by way of example and not limitation. Embodiments can support a variety of actions and additional data depending on the capabilities and configuration of voicemail application 201 and voice message analysis system 200.

Returning briefly to FIG. 2, server engine 270 and action service 230 cooperate to provide a designer operator interface 260 that allows a user to create new actions or perform operations on existing actions, such as editing or deleting existing actions. If a user selects to create a new action, action service 230 assigns action a unique identifier to uniquely identify the action in data store 206. Each action 252 can comprise a variety of data.

Figure 8:
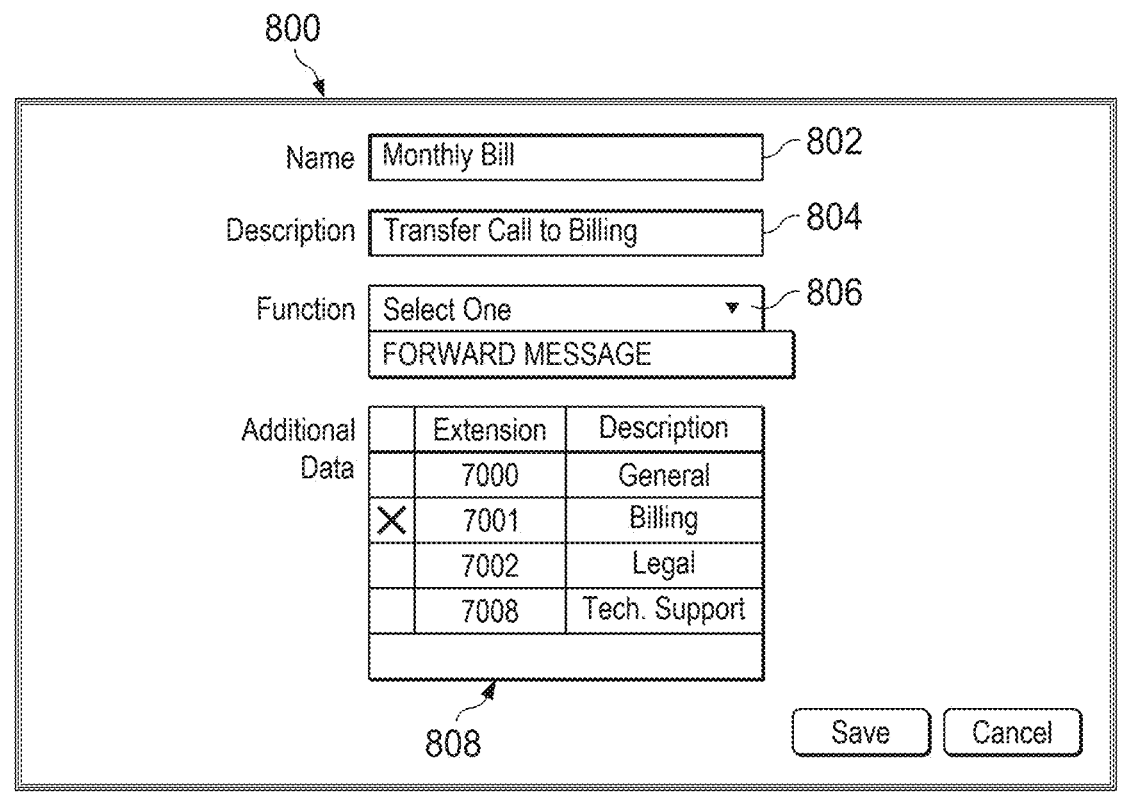
Figure 9:
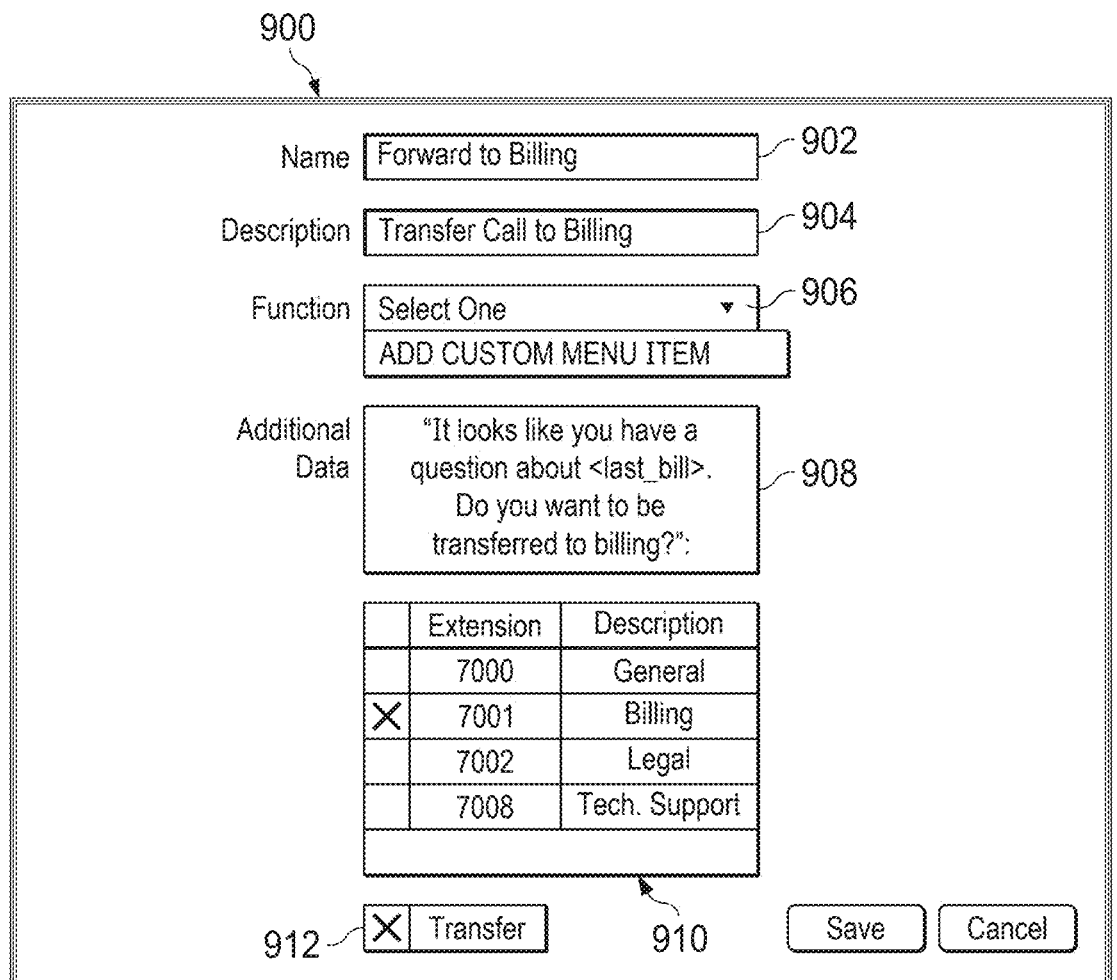
FIG. 9 is a diagrammatic representation of one embodiment of an operator interface page with controls to define an action.

FIG. 8 is a diagrammatic representation of one embodiment of an operator interface page 800 to allow a user to design an action, FIG. 9 is a diagrammatic representation of another embodiment of an operator interface page 900 to allow a user to design an action. If a user selects to create a new action, action service 230 assigns the new action a unique identifier to identify the action in data store 206. The designer assigns the action a name for ease of searching (e.g., via tool 802, 902). Further, operator interface page 800 includes a tool 804, 904 (e.g., a text box) to allow the operator to add a description to the action.

The operator interface page includes a tool 806, 906 (e.g., a dropdown menu or other selection tool) that allows the user to select from the available action types configured in voice message analysis system 200. Non-limiting examples of action types include forwarding a voice message to another mailbox, adding metadata to a voice message, selecting a predefined voice message option, creating a dynamically generated voice menu option.

Further, the operator interface page includes an additional control that allows the operator to specify additional data to be included in the action. In general, the additional data includes values for parameters passed for the corresponding function. For example, the operator may provide the extension or mailbox number to which a voice message is to be forwarded for a message forwarding function.

In some embodiments, the controls available for providing additional data depend on the action type selected. For example, in FIG. 8, additional data control 808 provides a list of available extensions to which voice messages can be forwarded (e.g., as specified in voice system data 254). In FIG. 9, the additional data control includes a first control (e.g., text box 908) to allow the user to enter text for a text-to-voice prompt, a second control (e.g., menu 910) to allow the user to select the extension to which the call is to be transferred or the voice message forwarded based on selection of the menu option and third control 912 to allow the user to specify whether the call is to be transferred to the specified extension when the menu option is selected or the voice message forwarded to the voicemail box for the specified extension when the menu option is selected.

For a SET METADATA action, the additional data tool may provide a menu to allow the user to select the metadata fields (e.g., as specified in voice system data 254) to which metadata is to be added and a control to specify the metadata values for the fields. For an ADD MENU ITEM action, the additional data tool may include a control to allow the user to select from a number of predefined menu options (e.g., as specified in voice system data 254).

Returning briefly to FIG. 2, server tier 202 may thus receive data to define or edit actions via interactions in operator interface 260. Actions configured via operator interface 260 can be persisted as actions 252 in data store 206. Actions 252 may be stored as records in one or more tables in a database, files in a file system or combination thereof or according to another data storage scheme. Each action 252 is assigned a unique identifier.

As discussed above, actions 252 may be referenced by real-time analysis rules and post-message analysis rules. Server engine 270 and rules service 210 cooperate to provide a designer operator interface 260 that allows a user to create new rules or perform operations on existing rules, such as editing or deleting existing rules. If a user selects to create a new rule, rules service 210 assigns action a unique identifier to uniquely identify the rule in data store 206. The new rule can be stored as a real-time analysis rule 244 or a post-message analysis rule 250. Voice message analysis system 200 applies the rules to voices messages. If a voice message matches a rule—for example, if the transcript of the voice message matches the rule—voice message analysis system 200 triggers the action specified in the rule.

According to one embodiment, real-time analysis rules 244 and post-message analysis rules 250 are specified according to a rules syntax IF expression THEN PERFORM ACTIONS. An expression can be a complex Boolean expression using Boolean operators such as 'AND', 'OR', and 'NOT'. The Boolean expression can, for example, reference text patterns, keywords, lexicons, or autoscores.

For example, the expression IF (voice_message match lexicon: 'Billing1') OR (voice_message match lexicon: 'Billing2') OR (voice message includes 'owing') THEN PERFORM 'Forward to Billing' specifies that if a voice message is determined to include any of the phrases in the Billing1 lexicon (e.g., FIG. 3) or Billing2 lexicon or the word "owing" then the "Forward to Billing" (FIG. 7B) action will be performed.

As another example, the expression IF (template_1: autoscore>90) THEN PERFORM 'Tag_Billing' specifies that if a voice message transaction autoscored by using template_1 (FIG. 4) and the autoscore determined based on that template is greater than 90, then 'Tag_Billing' action will be performed—that is, "Billing" will be added to a <group> field of voice message transaction. A rule can specify multiple actions.

As yet another example, the expression IF (template_1: autoscore>90) THEN PERFORM 'Tag_Billing' specifies that if a voice message transaction autoscored by using template_1 (FIG. 4) and the autoscore determined based on that template is greater than 90, then 'Tag_Billing' action will be performed—that is, "Billing" will be added to a <group> field of voice message transaction. A rule can specify multiple actions to perform.

Figure 10:
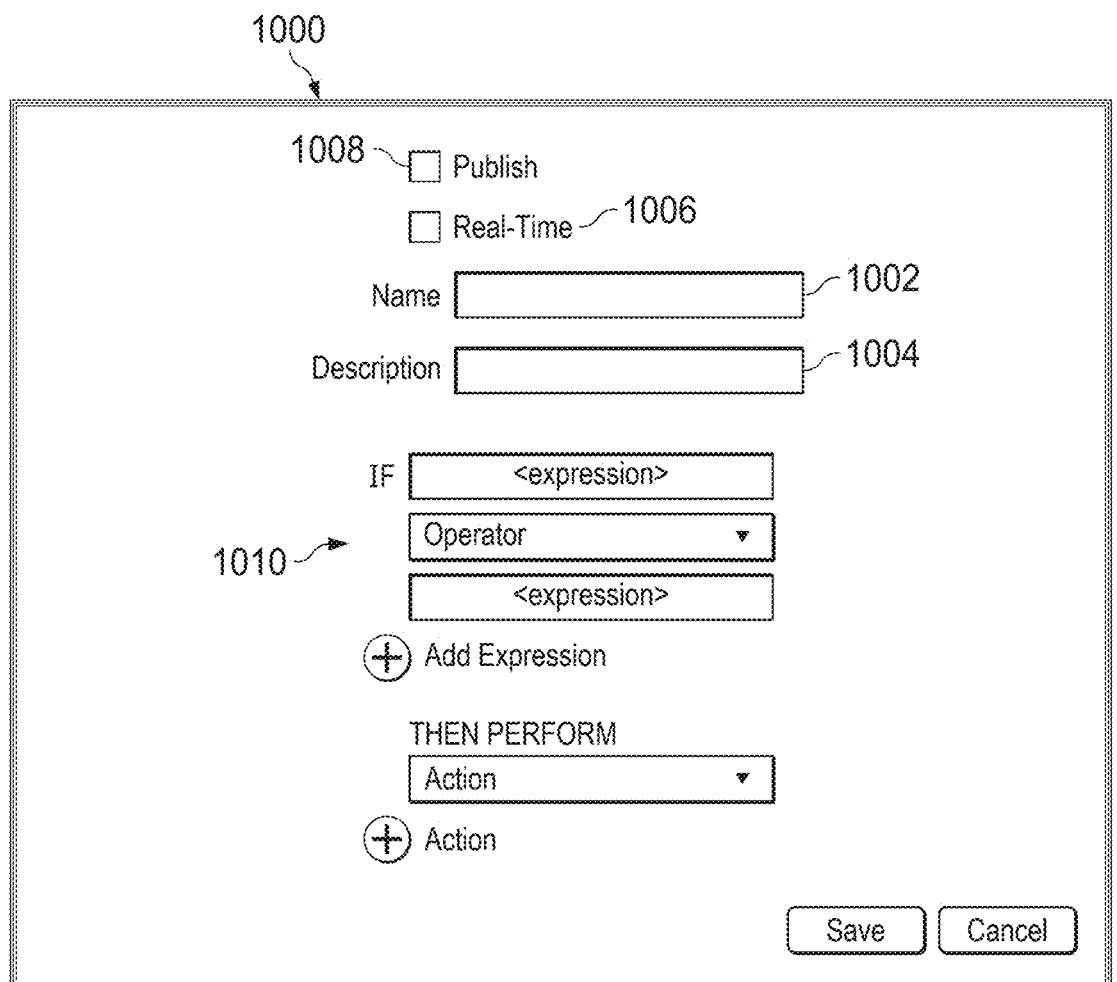
FIG. 10 is a diagrammatic representation of one embodiment of an operator interface page with controls to define a rule.

FIG. 10 illustrates an operator interface page 1000 for defining a new rule. Operator interface page 1000 provides a control 1002 to allow the user to provide a rule name and control 1004 to allow the user to provide a rule description. Control 1006 allows the user to specify whether the rule is a real-time analysis rule or a post-message analysis rule. Publish control 1008 in operator interface page 1000 allows the user to indicate that the rule is available to voice message analysis system 200 for evaluating voice messages.

Operator interface page 1000 includes controls 1010 to allow the user to define the rule. The user can enter any number of logical expressions that can be combined using Boolean operators to form an arbitrarily complex Boolean expression. In some embodiments, the user can enter expressions using freeform text. In other embodiments, controls 1010 include menus to all allow the user to select from available lexicons, autoscore templates, and actions.

Returning briefly to FIG. 2, server tier 202 may thus receive rules data via interactions in operator interface 260. Rules configured via operator interface 260 can be persisted as real-time analysis rules 244 and post-message analysis rules in data store 206. Rules may be stored as records in one or more tables in a database, files in a file system or combination thereof or according to another data storage scheme. Each rule is assigned a unique identifier. Real-time analysis service 216 analyzes voice messages in real-time according to real-time analysis rules 244 and post-message analysis service 222 analyzes stored voice messages in data store 208 according to post-message analysis rules 250.

While voice message analysis system 200 includes both real-time analysis and post-message analysis of voice messages, other embodiments include only real-time analysis or only post-message analysis.

Figure 11:
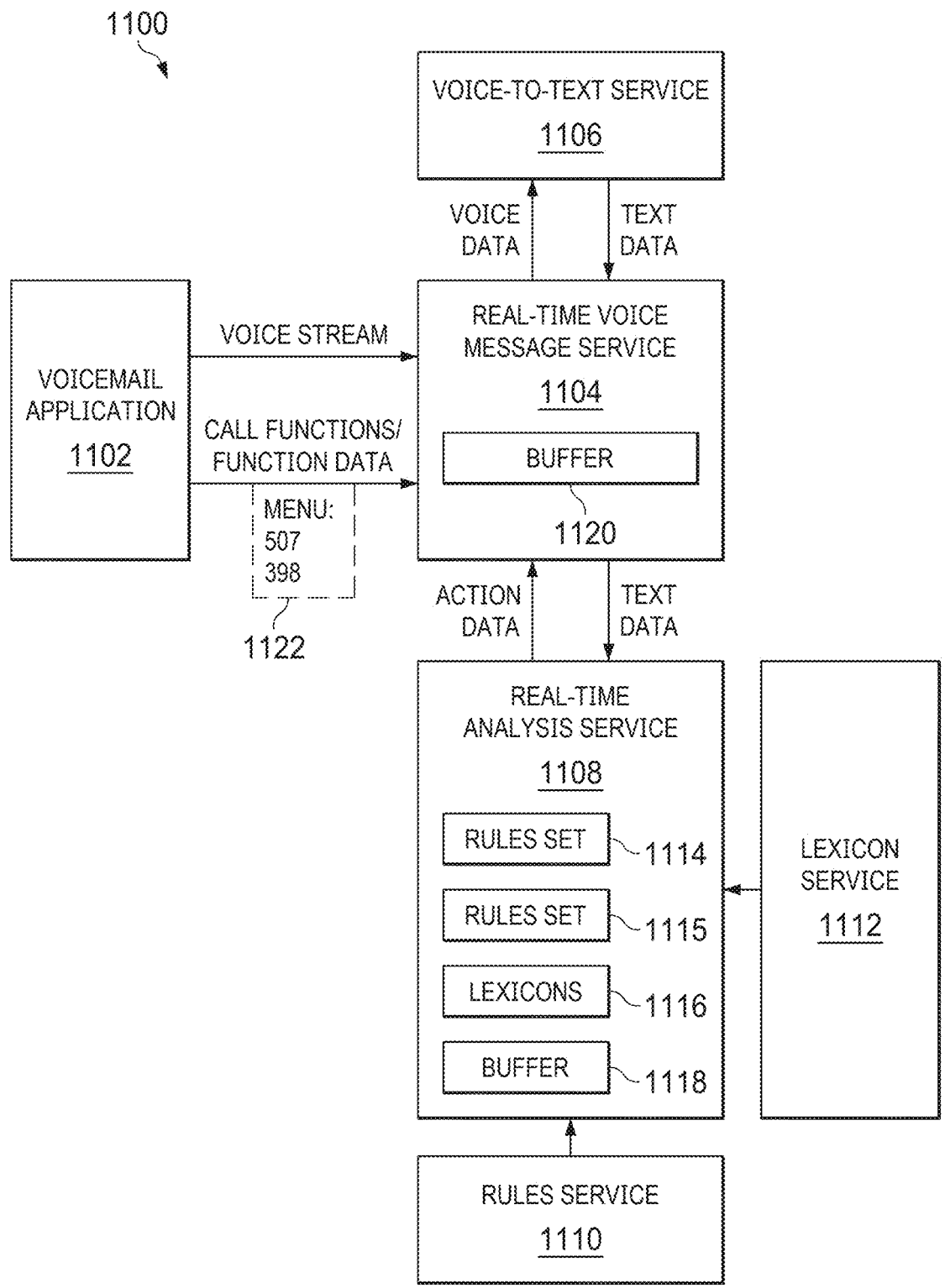
FIG. 11 is a diagrammatic representation of one embodiment of a real-time voice message analysis system.

FIG. 11 is a block diagram of one embodiment of a real-time voice message analysis system 1100 for analyzing voice messages received by a voicemail application 1102. One embodiment of real-time voice message analysis system 1100 may be implemented by voice message analysis system 200.

The real-time voice message analysis system 1100 includes a real-time voice message service 1104, a voice-to-text service 1106, a real-time analysis service 1108, a rules service 1110 and a lexicon service 1112. Real-time analysis of a voice message includes applying real-time analysis rules to text generated from the voice message. To this end, real-time analysis service 1108 retrieves real-time analysis rules from rules service 1110 and stores them as a rules set 1114. The rules are retrieved at the occurrence of a predefined event, such as startup or receiving a notification that an additional real-time rule has been published, according to a schedule or according to another scheme for updating rules set 1114. Further, rules service 1110 provides real-time analysis service 1108 with the actions 1115 referenced by the real-time analysis rules in rules set 1114 or otherwise provides data associated with the actions (e.g., provides the additional data for each action referenced in rules set 1114). Real-time analysis service 1108 retrieves any lexicons 1116 referenced by the rules from lexicon service 1112.

When a call is routed to voicemail, voicemail application 1102 establishes a connection—for example, a WebSocket connection or other connection with real-time voice message service 1104 and provides metadata for the voice message to voicemail application 1102. In one embodiment, the metadata includes the extension, user, group, or queue to which the call was directed, caller id information (e.g., caller name or caller number), the identity of the outgoing message (i.e., greeting) provided to the caller by the voicemail application 1102. As voicemail application 1102 is recording the voice message, voicemail application 1102 streams the voice message to real-time voice message service 1104. For example, voicemail application 1102 streams .wav data or other audio data to real-time voice message service 1104.

Real-time voice message service 1104 sets up connections with voice-to-text service 1106 and real-time analysis service 1108. As a voice message proceeds, real-time voice message service 1104 streams or otherwise provides the audio data to voice-to-text service 1106, which generates a real-time transcript of the voice message and returns text packets containing text generated from the voice message to real-time voice message service 1104. Real-time voice message service 1104 sends the text packets containing text generated by voice-to-text service 1106 from the audio stream to real-time analysis service 1108. The amount of text in each text packet may be based on a chunking criterion, such as time, amount of audio data processed, number of words, chunk size, or other chunking criterion. As one example, a chunking configuration parameter may specify how many seconds of audio data to convert to text before sending the text to real-time analysis service 1108. If the configuration parameter value is 5 seconds, each text packet will include text data for a corresponding 5 seconds of the voice message audio, with the last transcript chunk for the voice message potentially corresponding to a smaller (or larger) amount of time depending on implementation.

In one embodiment, real-time analysis service 1108 analyzes the text data in each text packet—for example, analyzes each transcript chunk—according to real-time analysis rules. In addition (or instead of) analyzing text packets individually, real-time analysis service 1108 buffers the text data for a voice message in buffer 1118 and analyzes the complete set of text data in the text buffer, which may still be less than the entire voice message at any given time.

Based on the application of the real-time analysis rules 1114, real-time analysis service 1108 sends action data associated with a voice message to real-time voice message service 1104. The action data may specify actions to take based on the voice message and include additional data associated with the actions. Variables included in an action may be resolved at real-time analysis service 1108 or real-time voice message service 1104, based on implementation.

In one embodiment, real-time voice message service 1104 processes the action data to invoke the corresponding functions of voicemail application 1102 as the action data is received from real-time analysis service 1108. In another embodiment, real-time voice message service 1104 collects action data associated with a voice message in a buffer 1120 and invokes the functions of voicemail application 1102 corresponding to the buffered actions at the occurrence of a specified event, such as receiving an indication that the caller has completed the voice message or an indication that real-time analysis service 1108 has processed the last text data from a voice message.

Real-time voice message service 1104 maps the action data to functions that can be called via the interface for voicemail application 1102. For example, for a FORWARD MESSAGE action, real-time voice message service 1104 invokes the message forwarding function at voicemail application 1102 (e.g., via an API call mapped to the FORWARD MESSAGE action) and provides the additional data associated with the FORWARD MESSAGE action to voicemail application 1102 as data for the function (e.g., as parameters of the API call) to cause the voicemail application 1102 to forward the message to the voicemail box for the extension, agent, group or queue. For a SET METADATA action, real-time voice message service 1104 invokes the appropriate mapped function at the voicemail application 1102 and sends the metadata identifiers and values specified in the additional data for the SET METADATA action to voicemail application 1102 as data for the function in a format consumable by voicemail application 1102 to cause the metadata to be set on a voice message.

In one embodiment, when real-time voice message service 1104 processes an ADD MENU ITEM action or an ADD CUSTOM MENU ITEM, real-time voice message service 1104 invokes the function to add a menu option to a post message voice menu at voicemail application 1102 and sends the menu option specified in the additional data for the action to voicemail application 1102 as data for the function in a format consumable by voicemail application 1102 to cause the voicemail application 1102 to include the menu option in a post-message menu.

In other embodiments, real-time voice message service 1104 collects menu options for a voice message in a voice menu definition and sends the voice menu definition to voicemail application 1102 as data for the function when the entire voice message has been analyzed (or according to another rule). For example, in one embodiment, real-time voice message service 1104 analyzes the action data returned by real-time analysis service 1108 for a voice message, identifies all the unique menu options included for the ADD MENU ITEM or ADD CUSTOM MENU ITEM actions—in other words discards duplicate menu options— and builds a custom IVR menu definition, invokes a voice menu function of voicemail application and provides the menu definition to voicemail application 1102 as data for the function in a format consumable by voicemail application 1102. In the illustrated embodiment, the IVR menu definition 1122 specifies the predefined menu options or custom menu options to include in the IVR menu. For example, IVR menu definition 1122 specifies that voicemail application 1102 should connect the caller to an IVR menu that has menu option '507' (e.g., tech support menu option in FIG. 7B) and menu option '398', for example a menu option related to a shipping department, Thus, real-time analysis can be used to build a voice menu customized to the caller's message.

Again, FORWARD, SET METADATA, ADD MENU ITEM, ADD CUSTOM MENU ITEM are merely provided as illustrative examples of actions supported by one embodiment of a real-time voice message service 1104.

Figure 12:
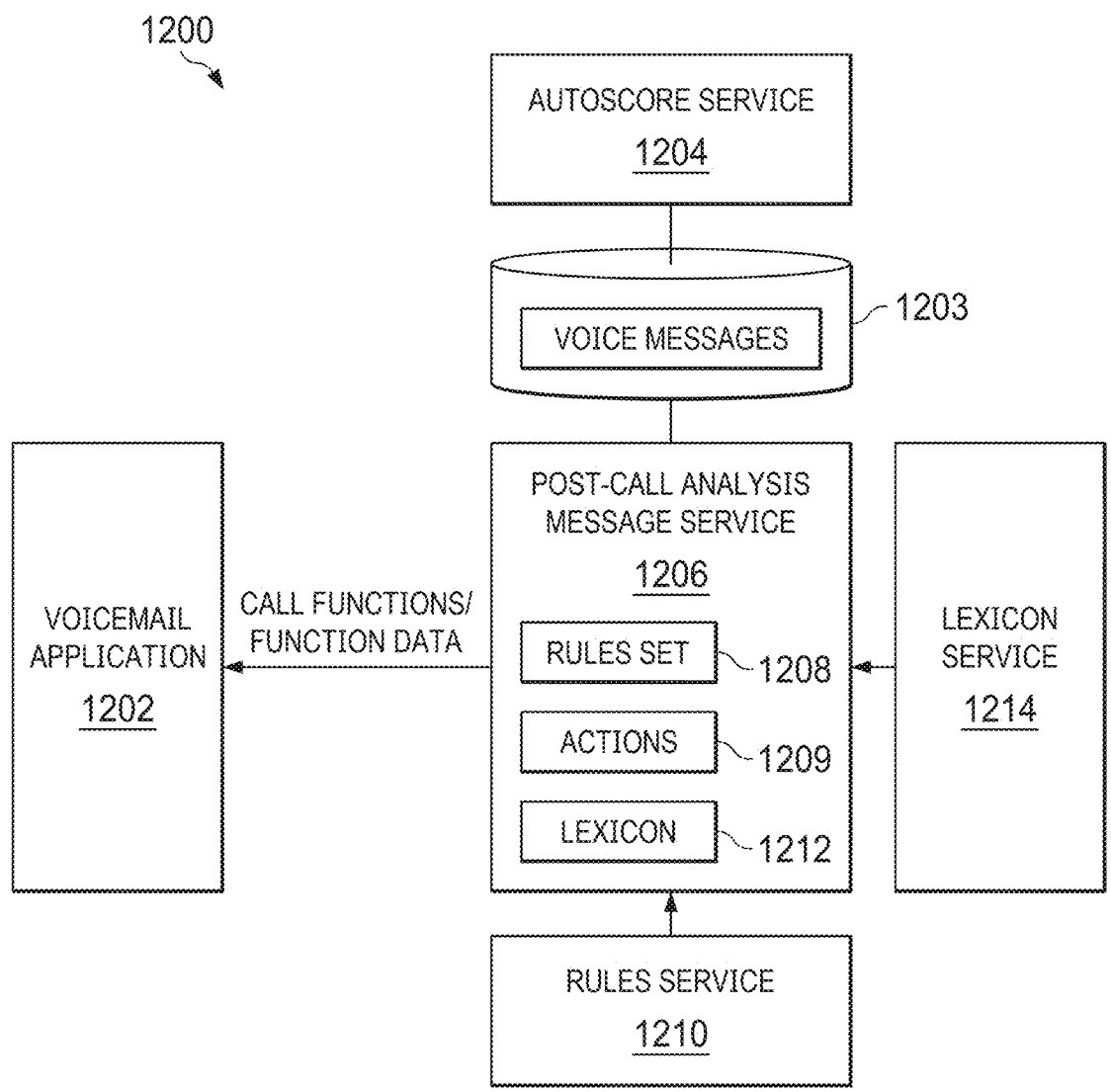
FIG. 12 is a diagrammatic representation of one embodiment of a post-message voice message analysis system.

FIG. 12 is a block diagram of one embodiment of a post-message voice message analysis system 1200 for analyzing voice messages received from voicemail application 1202, One embodiment of post-message voice message analysis system 1200 may be implemented by voice message analysis system 200.

Post-message voice message analysis system 1200 includes a voice message data store 1203 of voice message transactions. Voice message data store 1203 comprises one or more databases, file systems or other data stores, including distributed data stores. Voice message data store 1203 may be provided in addition to (or instead of) any voice message data store maintained by voicemail application 1202.

Each voice message transaction in voice message data store 1203 comprises a voice message transcript and associated metadata. Examples of associated metadata include, but are not limited to, call set-up information, traffic statistics, call type, ANI information, DNIS information, CTI information, agent information, MIS data or other data. For example, voice transaction metadata may include the mailbox to which the message was saved, the extension, user (e.g., agent or other user), group, or queue to which the call was routed prior to going to voicemail, caller id information (e.g., caller name, caller number), the identifier for the outgoing voicemail message (i.e., greeting) provided to the caller by the voicemail system, call time, tags based on real-time analysis of the voice message, metadata collected from a knowledge base, IVR responses recorded with a voice message. An autoscore service 1204 scores voice message transactions from data store 1203 according to autoscore templates and stores autoscore data as metadata of the transactions.

Post-message analysis of a voice message includes applying post-message analysis rules to text generated from the voice message. To this end, post-message analysis service 1206 retrieves a set of post-message analysis rules 1208 from rules service 1210. The rules are retrieved at the occurrence of a predefined event, such as startup or receiving a notification that an additional post-message rule has been published, according to a schedule or according to another scheme for updating post-message analysis rules 1208. Further, rules service 1210 provides post-message analysis service 1206 with the actions 1209 referenced by the post-message analysis rules 1208 or otherwise provides data associated with the actions (e.g., provides the additional data for each action referenced in rules set 1114). Further, post-message analysis service 1206 retrieves any lexicons 1212 referenced by the post-message analysis rules 1208 from lexicon service 1214.

Post-message analysis service 1206 analyzes stored voice messages in data store 1203 to determine if the voice messages meet the various post-message analysis rules. For example, for a rule that depends on an autoscore template, post-message analysis service 1206 searches for voice messages scored by that autoscore template and determines if the expression from the rule is met such that the specified action is to be performed.

For a FORWARD MESSAGE action, post-message analysis service 1206 invokes the message forwarding function at voicemail application 1202 and provides the additional data for the action to voicemail application 1202 as data for the function (e.g., as parameters of an interface call) to cause the voicemail application 1202 to forward the message to the appropriate voicemail box. In addition (or instead of) interacting with voicemail application 1202 to forward the message, post-message analysis service 1206 adds the extensions, users, groups or queues specified in the additional data to the metadata of the voice message transaction. For a SET METADATA action, post-message analysis service 1206 sets the metadata on a voice transaction that meets the rule in data store 1203. It will be appreciated that FORWARD MESSAGE and SET METADATA are simply provided as non-limiting examples of actions that can be supported by post-message analysis service.

Figure 13:
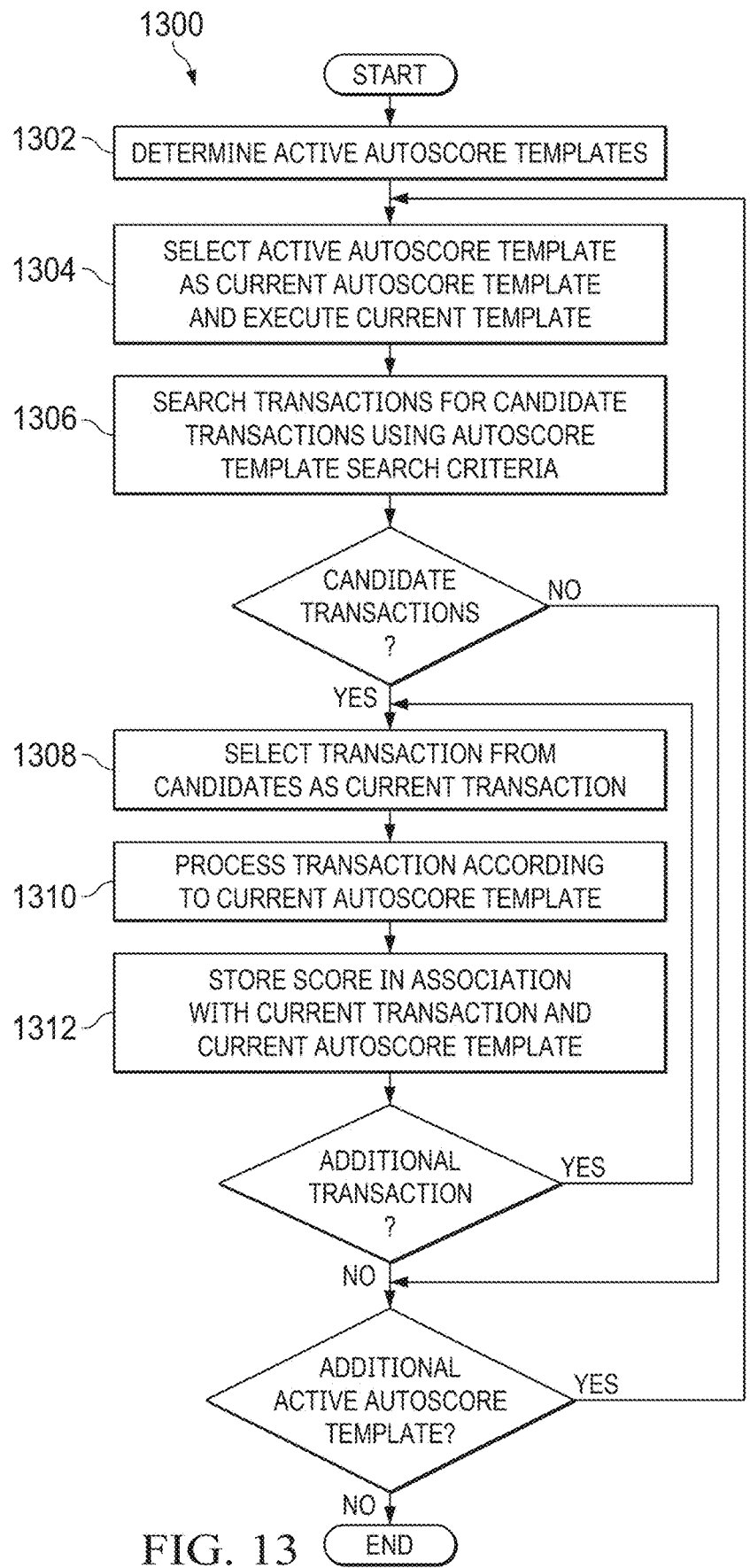
FIG. 13 is a flow diagram illustrating one embodiment of a method for autoscoring voice messages.

As discussed above, rules rely on autoscoring in some embodiments. FIG. 13 is a flow chart illustrating one embodiment of a method 1300 for autoscoring voice messages. The steps of FIG. 13 may be implemented by a computer system that implements a voice message analysis system (e.g., voice message analysis system 200, post-message voice message analysis system 1200). The computer system may comprise a processor coupled to a data store, such as voice message data store 121, data store 208, data store 206, data store 1203. In one embodiment, the processor implements an auto scorer, such as autoscore service 228 or autoscore service 1204, to implement method 1300.

The voice message analysis system identifies active autoscore templates from a set of autoscore templates (e.g., autoscore templates 248) (step 1302). For example, the voice message analysis system may query a data store for templates having an execution start data that is less than or equal to the current date and an execution end date that is greater than equal to the current date. The voice message analysis system selects an active template as the "current autoscore template", loads the current autoscore template, including any lexicons included in the autoscore template, and executes the current autoscore template (step 1304). For the current autoscore template, the voice message analysis system formulates search queries based on the search criteria in the current autoscore template and searches a data store (e.g., data store 208, data store 1203) for candidate voice messages that meet the search criteria of the active autoscore template (step 1306). According to one embodiment, the voice message analysis system includes as an implicit search criterion for the autoscore template, that the candidate voice messages are voice messages that have not previously been autoscored based on the current autoscore template. The voice message analysis system searches the voice messages to determine candidate voice message based on voice message metadata that meets the search criteria. In addition, or in the alternative, the voice message evaluation system searches the transcripts of the voice messages to determine candidate voice messages that meet the search criteria of the current autoscore template. If there are no candidate voice messages that meet the search criteria of the current autoscore template, the voice message analysis system moves to the next active autoscore template. If there are voice messages that meet the search criteria for the current autoscore template, processing proceeds to step 1308 and the voice message analysis system selects a candidate voice message as the current voice message.

The voice message analysis system applies the current autoscore template to the current voice message to determine an autoscore associated with the voice message for the autoscore template (step 1310) and stores the autoscore for the autoscore template in association with the current voice message (step 1312). For example, the identity of the autoscore template and the score generated according to the autoscore template for the voice message may be stored as part of the voice message's metadata in a voice message data store 121, 208, 1203. In another embodiment, the autoscore generated for the voice message is stored elsewhere in a manner such that the score is linked to both the voice message and the autoscore template that was used to generate the voice message.

The current autoscore template can be applied to each candidate voice message. Furthermore, each active autoscore template may be executed. The steps of FIG. 13 are provided by way of example. Steps may be performed in other orders. Moreover, steps may be repeated or omitted, additional steps added, or alternate steps performed.

Figure 14:
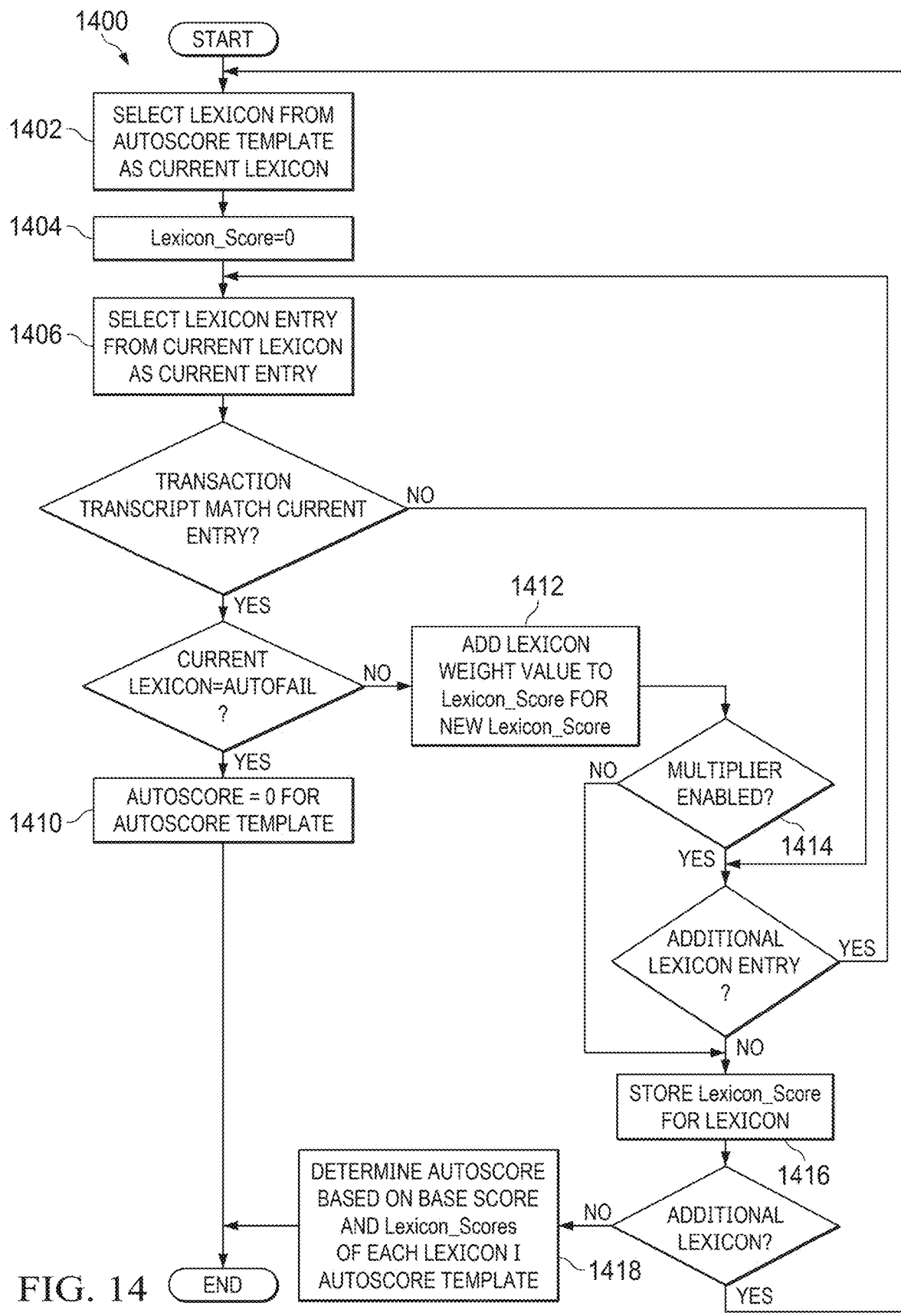
FIG. 14 is a flow diagram illustrating one embodiment of a method for autoscoring a current voice message using a current autoscore template.

FIG. 14 is a flow chart illustrating one embodiment of a method 1400 for autoscoring a current voice message using a current autoscore template. According to method 1400, the voice message analysis system selects a lexicon from the current autoscore template as the current lexicon (step 1402) and sets a score for the current lexicon to 0 (step 1404). The voice message analysis system selects a lexicon entry from the current lexicon as a current entry (step 1406) and determines if the voice message matches the current lexicon entry. For example, the voice message analysis system searches the transcript for words/phrases that match the words/phrases or statements specified in the current lexicon entry. If the transcript does not match the lexicon entry, the voice message analysis system moves to the next lexicon entry.

If a voice message matches the lexicon entry and the current lexicon is designated as an auto fail lexicon for the autoscore template, the voice message analysis system can output an autoscore of 0 for the voice message for the current autoscore template (step 1410) and move to the next candidate voice message. If the lexicon is not designated as an auto fail lexicon for the autoscore template, the voice message analysis system can add the lexicon weight value (e.g., as specified via slider 422) to the current lexicon score to update the current lexicon score (step 1412). The lexicon weight value may be reduced for the entry if the entry has an entry weight that is less than 1.

If the multiplier is not enabled (e.g., as specified via multiplier control 424) (step 1414), the voice message analysis system stores the lexicon score for the current lexicon, which will equal the lexicon weight value for the current lexicon at this point (step 1416), and moves to the next lexicon in the current autoscore template.

If the multiplier is enabled, the voice message analysis system can move to the next entry in the lexicon; that is, return to step 1406 and select the next lexicon entry from the current lexicon as the current lexicon entry. Thus, the lexicon score for the current lexicon can increase for each lexicon entry that the voice message matches. When all the lexicon entries in the lexicon have been processed, the voice message analysis system can store the lexicon score for the current lexicon (step 1416). The voice message analysis system can apply each lexicon incorporated in the autoscore template and determine a lexicon score for each lexicon.

At step 1418, the voice message analysis system determines an autoscore for the current voice message and current autoscore template based on the lexicon scores for the lexicons in the current autoscore template, a base score specified in the autoscore template (e.g., as specified via base score control 410) and a target score algorithm selected for the autoscore template. For example, the voice message analysis system adds the highest lexicon score of the lexicons associated with the autoscore template to the base score, adds the lowest lexicon score of the lexicons associated with the autoscore template to the base score, or adds the lexicon scores for all the lexicons associated with the autoscore template to the base score, depending on configuration. According to one embodiment, the voice message analysis system may limit the minimum and maximum for the autoscore for the current voice message to a range, such as, e.g., 0-100.

With the multiplier enabled, a voice message may be scored once for each lexicon entry in a lexicon that the appropriate transcript of the voice message matches. In another embodiment, the voice message may be scored for every hit over every lexicon entry in the voice message transcript to which the lexicon applies. Using the FIG. 4, and assuming the word "collections" was included in the "Billing2" lexicon and a voice message included "collections" a number of times, then lexicon score for the "Billing2" lexicon can be increased by ten for each instance of "collections."

The steps of FIG. 14 are provided by way of example. Steps may be performed in other orders. Moreover, steps may be repeated or omitted, additional steps added, or alternate steps performed.

Figure 15:
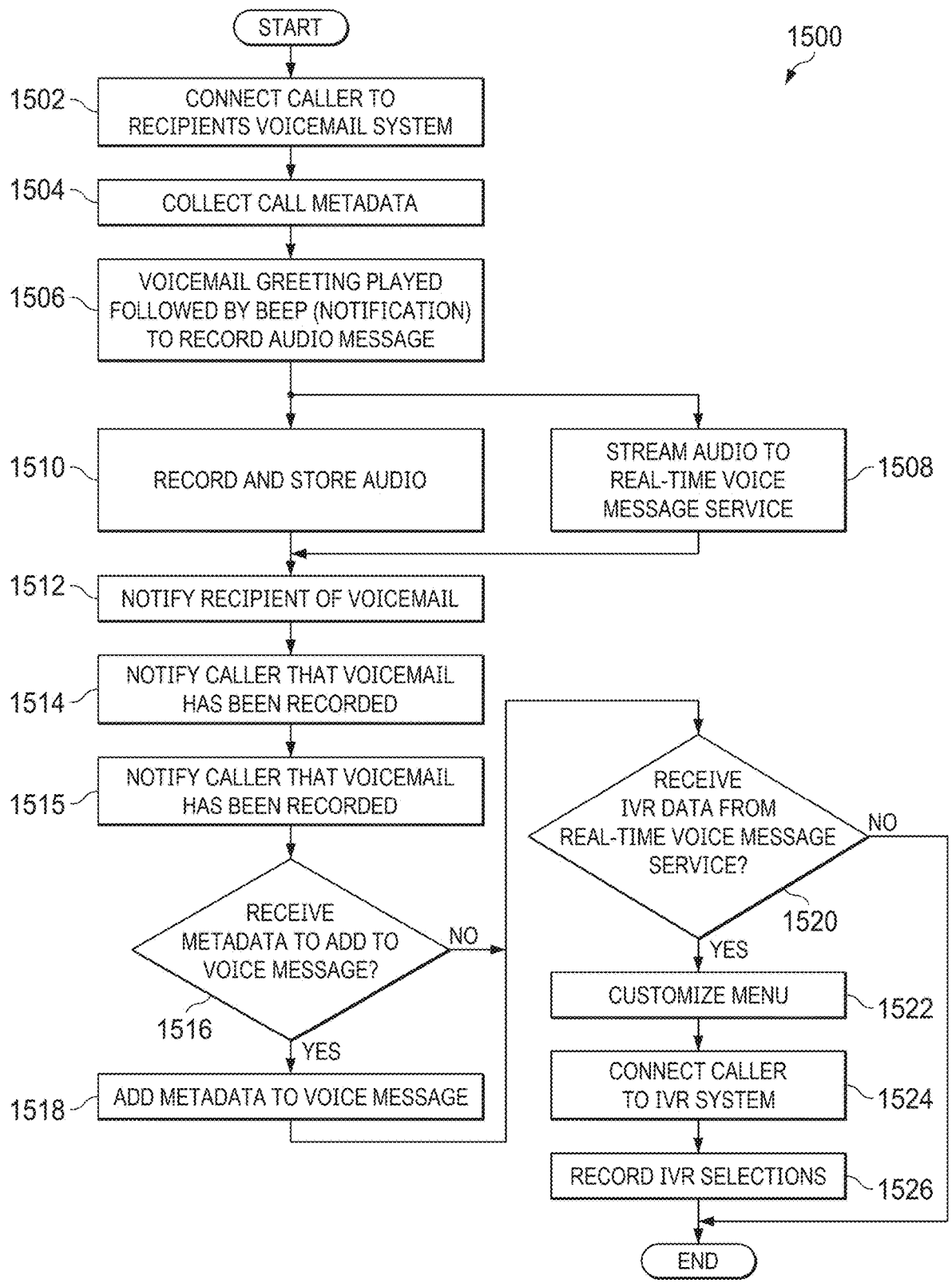
FIG. 15 is a flow chart illustrating one embodiment of a method for integrating real-time processing of a voice message with an in-progress call.

FIG. 15 is a flow chart illustrating one embodiment of a method for integrating real-time processing of a voice message with a call that is in progress. According to one embodiment, the steps of method 1500 are embodied on a non-transitory computer readable medium as computer-executable instructions. Various steps of method 1500 may be implemented by a voicemail system, such as voicemail system 114. According to embodiment, various steps of method 1500 may be implemented by a processor running a voicemail application, such as voicemail application 201 or voicemail application 1102.

At step 1502, the voicemail system receives a call connected to the voicemail application by the call routing system. The voicemail system collects call metadata, such as recipient information (e.g., the extension, user, group, or queue to which the call was directed), caller id information (e.g., caller name and caller number), the identity of the outgoing message provided to the caller by the voicemail system (step 1504). The voicemail system plays a greeting followed by a notification to record a voice message (step 1506). The voicemail system connects to a real-time voice message service (e.g., real-time voice message service 125, real-time voice message service 212, real-time voice message service 1104) and streams the message to the real-time voice message service (step 1508) in parallel with recording and storing the voice message (step 1510).

The voicemail system notifies the recipient of the voicemail (step 1512) and notifies the caller that the voicemail has been recorded (step 1514) and notifies the real-time voice message analysis service that the voicemail has been recorded (step 1515). At step 1516, the voicemail system determines if it has received metadata to add to the voice message—for example, the voicemail system determines if the real-time voice message service has invoked a function to set metadata and provided metadata to set on the voice message. If so, the voicemail system adds the metadata to the voice message (step 1518). The voicemail system further determines if the real-time voice message service has provided an IVR menu definition—for example, if the real-time voice message service has invoked a function to provide a post-message menu and provided a definition for the post-message menu (step 1520). If so, the voicemail system connects the caller to an IVR system (step 1522) and customizes the IVR menu for the caller according to the menu definition (step 1524). The caller's selections from the IVR menu are recorded as metadata of the voice message (step 1526).

The steps of FIG. 15 are provided by way of example. Steps may be performed in other orders. Moreover, steps may be repeated or omitted, additional steps added, or alternate steps performed.

Figure 16:
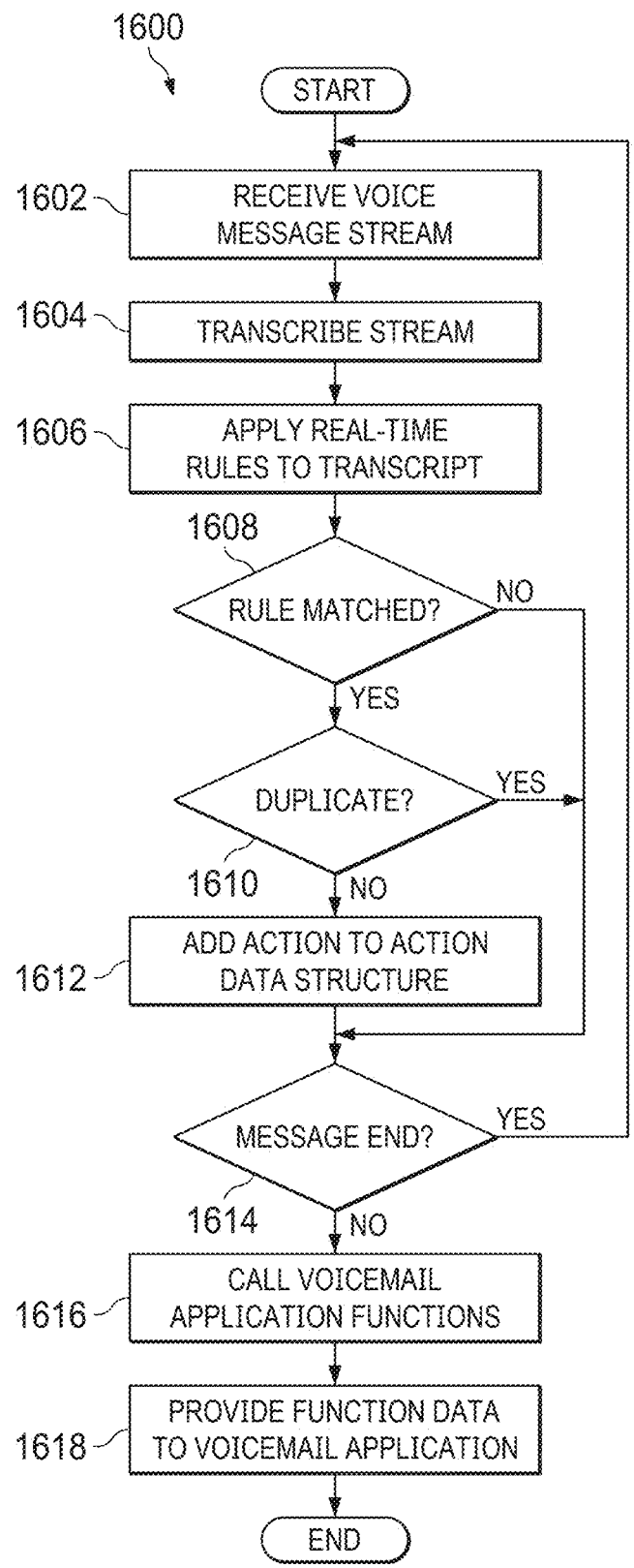
FIG. 16 is a flow chart illustrating one embodiment of a method for real-time processing of a voice message.

FIG. 16 is a flow chart illustrating one embodiment of a method 1600 for processing a voice message. The steps of FIG. 16 may be implemented by a processor of a message analysis system (e.g., voice message analysis system 200) that executes instructions stored on a computer readable medium to implement a real-time voice message analysis system, such as real-time voice message analysis system 1100. According to one embodiment, the processor implements a real-time voice message service (e.g., real-time voice message service 125, real-time voice message service 212, real-time voice message service 1104), a voice-to-text service (e.g., voice-to-text service 127, voice-to-text service 214, voice-to-text service 1106) and a real-time analysis service (e.g., real-time analysis service 129, real-time analysis service 216, real-time analysis service 1108).

At step 1602, a stream of voice message audio data is received in real-time with the voice message being recorded by a voicemail system. The audio stream is transcribed (step 1604). As discussed above, the audio stream may be transcribed in chunks, such as 5 second chunks. In any event, the real-time analysis rules are applied to the transcribed audio stream (step 1606). In one embodiment, the real-time analysis rules are applied on a chunk-by-chunk basis. In addition, or in the alternative, the real-time analysis rules can be applied to the entire transcript as received so far. If a real-time analysis rule is met (as determined at step 1608), the real-time voice message analysis system determines if the action specified by the rule is duplicative of an action already determined for the voice message (step 1610). If the action is not a duplicate, the real-time voice message analysis system adds the action to a data structure of actions to be performed (step 1612). In some embodiments, this may include adding a menu option to a voice menu definition if the action is to add a menu option. When the entire message audio stream has been processed (e.g., as determined at step 1614) (or at the occurrence of another defined event, such as receiving a notification from the voicemail system that the voice message has been recorded), the real-time voice message analysis system invokes the functions of the voicemail application corresponding to the actions (step 1616) and provides data for the functions to the voicemail application—for example, as parameters of the corresponding calls (step 1618). The data provided to the voicemail system for a function is based on the data associated with the action corresponding to the function. In an even more particular embodiment, the data provided to the voicemail system for a function is based on the additional data specified for the action corresponding to the function. For example, the real-time voice message analysis system may invoke a function to forward the voice message to another mailbox and provide a destination identifier as a parameter of the call to forward the message, where the destination identifier is specified in the additional data for the action that resulted in the call.

The steps of FIG. 16 are provided by way of example. Steps may be performed in other orders. Moreover, steps may be repeated or omitted, additional steps added, or alternate steps performed.

Figure 17:
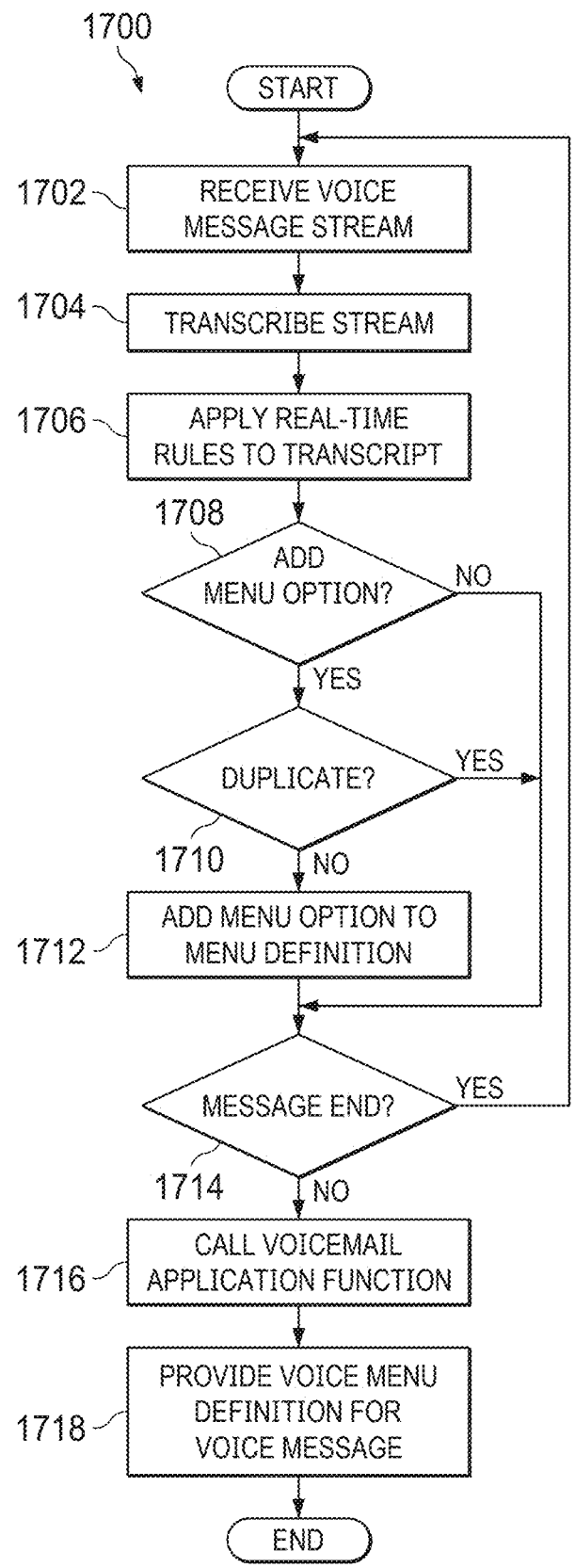
FIG. 17 is a flow chart illustrating one embodiment of a method for generating a voice menu definition to customize a voice menu in real-time with respect to a voice message.

FIG. 17 is a flow chart illustrating one embodiment of a method 1700 for generating a voice menu definition to customize a voice menu, such as an IVR menu, for a voice message. The steps of FIG. 17 may be implemented by a processor of a message analysis system (e.g., voice message analysis system 200) that executes instructions stored on a computer readable medium to implement a real-time voice message analysis system, such as real-time voice message analysis system 1100. According to one embodiment, the processor implements a real-time voice message service (e.g., real-time voice message service 125, real-time voice message service 212, real-time voice message service 1104), a voice-to-text service (e.g., voice-to-text service 127, voice-to-text service 214, voice-to-text service 1106) and a real-time analysis service (e.g., real-time analysis service 129, real-time analysis service 216, real-time analysis service 1108).

At step 1702, a stream of voice message audio data is received in real-time with the voice message being recorded by a voicemail system. The audio stream is transcribed (step 1704). As discussed above, the audio stream may be transcribed in chunks, such as 5 second chunks. In any event, the real-time analysis rules are applied to the transcribed audio stream (step 1706). In one embodiment, the real-time analysis rules are applied on a chunk-by-chunk basis. In addition, or in the alternative, the real-time analysis rules can be applied to the entire transcript as received so far. If a real-time analysis rule that specifies performing an action to add a menu option to a voice menu is satisfied (as determined at step 1708), the real-time voice message analysis system determines if the menu option has already been added to a voice menu definition for the voice message (step 1710). In other words, the real-time voice message analysis determines if the menu option to be added is a duplicate of a menu option already included in the voice menu definition. If the menu option is not a duplicate, the real-time voice message analysis system adds the menu option to the voice menu definition (resolving any unresolved variables in the menu option from the knowledge base) (step 1712). When the entire message audio stream has been processed (e.g., as determined at step 1714) (or at the occurrence of another defined event, such as receiving a notification from the voicemail system that the voice message has been recorded), the real-time voice message analysis system invokes a function of the voicemail application to create a voice menu (step 1716) and provides the voice menu definition to the voicemail application (step 1718).

The steps of FIG. 17 are provided by way of example. Steps may be performed in other orders. Moreover, steps may be repeated or omitted, additional steps added, or alternate steps performed.

Returning to FIG. 2, analytics service 235 may produce reports based on analyzing transactions. For example, analytics service 235 can be configured to periodically review voice message transactions to determine top terms and sentiment. According to one embodiment, analytics service 235 can apply machine learning or other models to determine, for example, the relationship of a rule to a response. If a particular response is rarely selected, then the rule that resulted in the menu option being included can be identified for revision. In another embodiment, analytics service 235 applies machine learning models to determine words or phrases that are common to transcripts for voice messages where the callers also selected a particular menu option from a post-message voice menu. In this manner, analytics service 140 may create new lexicons or new words or phrases to add to a lexicon for a rule.

U.S. patent application Ser. No. 17/243,330, entitled "Systems and Methods for Identifying Conversation Roles," filed Apr. 28, 2021, which is hereby fully incorporated by reference herein, describes a text mining engine that is capable of performing a variety of content analytics and text mining operations based on a transcript of a conversation between an agent and caller. According to one embodiment, analytics engine 235 includes or makes calls to a text mining engine to perform content analytics and text mining operations, such as, but not limited to categorization, classification, semantic analysis, sentiment analysis, tonality analysis, summarization, language detection, entity extraction, and other operations.

The text mining engine analyzes words in a voice message transcript that represent unique characteristics of a voice message and, based on the unique characteristics determines metadata describing the voice message such as tonality of words spoken by the caller. Outputs from the text mining engine are indexed and useful for various purposes. In some embodiments, analytics engine 235 generates an analysis report including a tonality result from the sentiment analysis.

Figure 18:
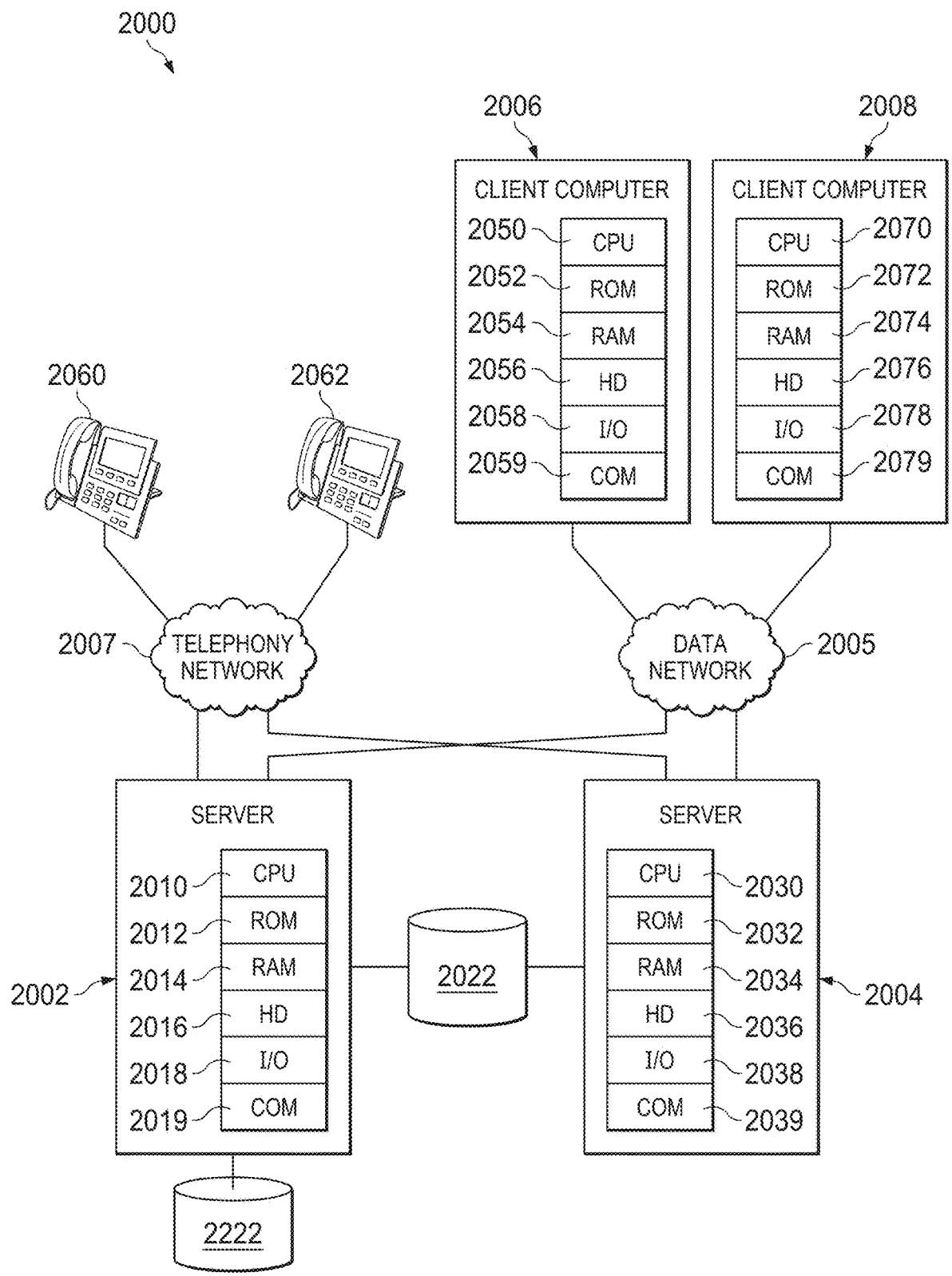
FIG. 18 is a diagrammatic representation of a distributed network computing environment.

FIG. 18 is a diagrammatic representation of a distributed network computing environment 2000 where embodiments disclosed herein can be implemented. In the example illustrated, network computing environment 2000 includes a data network 2005 that can be bi-directionally coupled to client computers 2006, 2008 and server computers 2002, 2004. Network 2005 may represent a combination of wired and wireless networks that network computing environment 2000 may utilize for various types of network communications known to those skilled in the art. Data network 2005 may be, for example, a WAN, LAN, the Internet or a combination thereof. Each of client computers 2006, 2008 and server computers 2002, 2004 can host one or more virtual environments.

Further, the network computing environment includes a telephony network 2007 to connect server computer 2002 and server computer 2004 to voice instruments 2060 and external voice instruments 2062. Telephony network 2007 may utilize various types of voice communication known in the art. Telephony network may comprise, for example, a PSTN, PBX, VOIP network, cellular network or combination thereof.

For the purpose of illustration, a single system is shown for each of computer 2002, 2004, 2006, 2008 and a single voice instrument is shown for each of voice instruments 2060, 2062. However, each computer 2002, 2004, 2006, 2008 may comprise a plurality of computers (not shown) interconnected to each other over network 2005. For example, a plurality of computers 2002, a plurality of computers 2004, a plurality of computers 2006, and a plurality of computers 2008 may be coupled to network 2005. Furthermore, a plurality of computers 2002, a plurality of computers 2004, a plurality of voice instruments 2062 and a plurality of voice instruments 2060 may be coupled to telephony network 2007.

Server computer 2002 includes central processing unit ("CPU") 2010, read-only memory ("ROM") 2012, random access memory ("RAM") 2014, hard drive ("HD") or storage memory 2016, input/output device(s) ("I/O") 2018 and communication interface 2019. I/O 2018 can include a keyboard, monitor, printer, electronic pointing device (e.g., mouse, trackball, stylus, etc.), or the like. Communications interface may include a communications interface, such as a network interface card, to interface with network 2005 and phone interface cards to interface with telephony network 2007.

According to one embodiment, server computer 2002 includes computer-executable instructions stored on a non-transitory computer readable medium coupled to a processor. The computer executable-instructions of server 2002 may be executable to provide, for example, various services described herein. For example, server computer 2002 may implement a voice message analysis system 200, a real-time voice message analysis system 1100 or a post-message voice message analysis system 1200. Server computer 2002 may store voice message transactions in data store 2020 and data to support voice message analysis in data store 2022.

The computer executable instructions may be executable to provide a variety of services to client computer 2006, 2008, such as providing interfaces to allow a designer to design lexicons, autoscore templates, actions, and rules. The computer executable instructions of server computer 2002 may be further executable to perform real-time analysis of voice messages or post-message analysis of voice messages. According to one embodiment, the computer executable instructions of server computer 2002 may be executable to implement server tier 202 of FIG. 2.

Computer 2004 comprises CPU 2030, ROM 2032, RAM 2034, HD 2036, I/O 2038 and communications interface 2039. I/O 2038 can include a keyboard, monitor, printer, electronic pointing device (e.g., mouse, trackball, stylus, etc.), or the like. Communications interface 2039 includes communications interfaces, such as interface cards, to interface with network 2005 and telephony network 2007. Computer 2004 may comprise voicemail system software to provide a voicemail system.

Computer 2006 comprises CPU 2050, ROM 2052, RAM 2054, HD 2056, I/O 2058 and communications interface 2059. I/O 2058 can include a keyboard, monitor, printer, electronic pointing device (e.g., mouse, trackball, stylus, etc.), or the like. Communications interface 2059 may include a communications interface, such as a network interface card, to interface with network 2005. Computer

2006 may comprise call center agent software to allow a call center agent to participate in call sessions and listen to voice messages.

Computer 2008 can similarly comprise CPU 2070, ROM 2072, RAM 2074, HD 2076, I/O 2078 and communications interface 2079. I/O 2078 can include a keyboard, monitor, printer, electronic pointing device (e.g., mouse, trackball, stylus, etc.), or the like. Communications interface 2079 may include a communications interface, such as a network interface card, to interface with network 2005. Computer 2008 may comprise a web browser or other application that can cooperate with server computer 2002 to allow a user to define lexicons, autoscore templates, actions, and rules. According to one embodiment, computer 2006 or computer 2008 may implement client tier 203.

Each of the computers in FIG. 18 may have more than one CPU, ROM, RAM, HD, I/O, or other hardware components. For the sake of brevity, each computer is illustrated as having one of each of the hardware components, even if more than one is used. Portions of the methods described herein may be implemented in suitable software code that may reside within ROM 2012, 2032, 2052, 2072; RAM 2014, 2034, 2054, 2074; HD 2016, 2036, 2056, 2076. In addition to those types of memories, the instructions in an embodiment disclosed herein may be contained on a data storage device with a different computer-readable storage medium. The instructions may be stored as software code elements on a data storage array, magnetic tape, floppy diskette, optical storage device, or other appropriate data processing system readable medium or storage device.

Embodiments of real-time voice message analysis and post-call message analysis according to the present disclosure may be implemented in a variety of systems including, by way of example, but not limitation, systems that implement embodiments of setting controls in an evaluation operator interface, as described in U.S. patent application Ser. No. 15/958,960, entitled "Data Processing Systems and Methods for Controlling an Automated Survey System," filed May 18, 2018, U.S. patent application Ser. No. 15/990,279, entitled "Artificial Intelligence Based Data Processing System for Automatic Setting of Controls in an Evaluation Operator Interface," filed May 25, 2018, or U.S. patent application Ser. No. 16/785,298, entitled "Artificial Intelligence Based Refinement of Automatic Control Setting in an Operator Interface Using Localized Transcripts," filed Feb. 7, 2020, or systems that implement provide automated surveys as described, for example, in U.S. patent application Ser. No. 15/958,960, entitled "Data Processing Systems and Methods for Controlling an Automated Survey System," filed Apr. 20, 2018, each of which is fully incorporated by reference herein.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise, Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A voice message processing system comprising:
    a voicemail system, the voicemail system providing a function of the voicemail system for voice message handling;
    a voice message analysis system coupled to the voicemail system, the voice message analysis system comprising:
        a data store storing a first action that corresponds to the function of the voicemail system, data associated with the first action, and a first voice message analysis rule comprising a criterion for triggering the first action, wherein the first voice message analysis rule is a real-time analysis rule;
        a processor;

a non-transitory, computer-readable medium storing a set of computer-executable instructions executable by the processor, the set of computer-executable instructions comprising instructions for:

connecting to the voicemail system;

receiving a real-time audio stream of a voice message being received from a caller;

transcribing the real-time audio stream to create a transcript in real-time with respect to the voice message;

applying the first voice message analysis rule to the transcript of the voice message; and based on a determination that the voice message matches the first voice message analysis rule, interacting with the voicemail system to implement the first action, wherein interacting with the voicemail system to implement the first action comprises programmatically calling the function of the voicemail system in real-time with respect to the voice message and providing data for the function of the voicemail system to the voicemail system based on the data associated with the first action, wherein the function of the voicemail system comprises a voice menu function to include a menu option in a voice menu to be played to the caller and wherein the data for the function of the voicemail system indicates the menu option to include in the voice menu.

2. The voice message processing system of claim 1, wherein the function of the voicemail system comprises a message forwarding function and the data for the function indicates a destination voicemail box to which the voice message is to be forwarded.

3. The voice message processing system of claim 1, wherein the function of the voicemail system adds metadata to the voice message and the data for the function includes a piece of metadata to add to the voice message.

4. The voice message processing system of claim 1, wherein the data associated with the first action comprises a variable name for a variable and wherein the set of computer-executable instructions further comprises instructions for:

resolving the variable name to determine a value for the variable; and passing the value for the variable to the voicemail system in the data for the function.

5. The voice message processing system of claim 1, wherein the voice message analysis system comprises a voice message store, a second action, data associated with the second action, and a post-message voice message analysis rule that comprises a criterion for triggering the second action, and wherein the set of computer-executable instructions further comprises instructions for:

storing a voice message transaction for the voice message in the voice message store, the voice message transaction comprising the transcript and an associated set of metadata;

accessing the post-message voice message analysis rule and the data associated with the second action;

applying the post-message voice message analysis rule to the transcript; and based on a determination that the voice message matches the post-message voice message analysis rule, modifying the associated set of metadata of the voice message transaction based on the data associated with the second action.

6. The voice message processing system of claim 1, wherein the voice menu is played after the voice message is recorded.

7. A computer program product comprising a non-transitory, computer-readable medium storing a set of computer-executable instructions, the set of computer-executable instructions comprising instructions for:

receiving a real-time audio stream of a voice message being received from a caller by a voicemail system;

transcribing the real-time audio stream to create a transcript of the voice message;

accessing data associated with a first action that corresponds to a function of the voicemail system and a first voice message analysis rule that comprises a criterion for triggering the first action, wherein the first voice message analysis rule is a real-time analysis rule; and based on a determination that the voice message matches the first voice message analysis rule, interacting with the voicemail system to implement the first action, wherein interacting with the voicemail system to implement the first action comprises programmatically calling the function of the voicemail system in real-time with respect to the voice message and providing data for the function of the voicemail system to the voicemail system based on the data associated with the first action, wherein the function of the voicemail system comprises a voice menu function to include a menu option in a voice menu to be played to the caller and wherein the data for the function of the voicemail system indicates the menu option to include in the voice menu.

8. The computer program product of claim 7, wherein the function of the voicemail system is a message forwarding function and the data for the function indicates a destination voicemail box to which the voice message is to be forwarded.

9. The computer program product of claim 7, wherein the function of the voicemail system adds metadata to the voice message and the data for the function includes a piece of metadata to add to the voice message.

10. The computer program product of claim 7, wherein the data associated with the first action comprises a variable name for a variable and wherein the set of computer-executable instructions further comprises instructions for:

resolving the variable name to determine a value for the variable; and passing the value for the variable to the voicemail system in the data for the function.

11. The computer program product of claim 7, wherein the set of computer-executable instructions further comprises instructions for:

storing a voice message transaction for the voice message in a voice message store, the voice message transaction comprising the transcript of the voice message and an associated set of metadata;

accessing data associated with a second action and a post-message voice message analysis rule that comprises a criterion for triggering the second action;

applying the post-message voice message analysis rule to the transcript; and based on a determination that the voice message matches the post-message voice message analysis rule, modifying the associated set of metadata of the voice message transaction based on the data associated with the second action.

12. The computer program product of claim 7, wherein the voice menu is played after the voice message is recorded.

13. A computer-implemented method comprising:
receiving a real-time audio stream of a voice message being received by a voicemail system from a caller;
transcribing the real-time audio stream to create a transcript of the voice message;
accessing data associated with a first action that corresponds to a function of the voicemail system and a first voice message analysis rule that comprises a criterion for triggering the first action, wherein the first voice message analysis rule is a real-time analysis rule and wherein the function; and
based on a determination that the voice message matches the first voice message analysis rule, interacting with the voicemail system to implement the first action, wherein interacting with the voicemail system to implement the first action comprises programmatically calling the function of the voicemail system in real-time with respect to the voice message and providing data for the function to the voicemail system based on the data associated with the first action, wherein the function of the voicemail system comprises a voice menu function to include a menu option in a voice menu to be played to the caller and wherein the data for the function of the voicemail system indicates the menu option to include in the voice menu.

14. The computer-implemented method of claim 13, wherein the function of the voicemail system is a message forwarding function and the data for the function indicates a destination voicemail box to which the voice message is to be forwarded.

15. The computer-implemented method of claim 13, wherein the function of the voicemail system adds metadata to the voice message and the data for the function includes a piece of metadata to add to the voice message.

16. The computer-implemented method of claim 13, wherein the data associated with the first action comprises a variable name for a variable and wherein the method further comprises:
resolving the variable name to determine a value for the variable; and
passing the value for the variable to the voicemail system in the data for the function.

17. The computer-implemented method of claim 13, further comprising:
storing a voice message transaction for the voice message in a voice message store, the voice message transaction comprising the transcript and an associated set of metadata;
accessing a set of data associated with a second action and a post-message voice message analysis rule that comprises a criterion for triggering the second action;
applying the post-message voice message analysis rule to the transcript; and
based on a determination that the voice message matches the post-message voice message analysis rule, modifying the associated set of metadata of the voice message transaction based on the data associated with the second action.

18. The computer-implemented method of claim 13, wherein the voice menu is played after the voice message is recorded.

* * * * *